(12) United States Patent
Senarath et al.

(10) Patent No.: US 11,039,321 B2
(45) Date of Patent: Jun. 15, 2021

(54) METHODS AND SYSTEMS FOR NETWORK SLICING

(71) Applicant: HUAWEI TECHNOLOGIES CO., LTD., Shenzhen (CN)

(72) Inventors: Nimal Gamini Senarath, Ottawa (CA); Chengchao Liang, Ottawa (CA); Wei Tan, Shanghai (CN); Hang Zhang, Nepean (CA); Wei Lu, Shanghai (CN); Wenqi Sun, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/026,563

(22) Filed: Jul. 3, 2018

(65) Prior Publication Data

US 2019/0021010 A1      Jan. 17, 2019

Related U.S. Application Data

(60) Provisional application No. 62/528,824, filed on Jul. 5, 2017.

(51) Int. Cl.
*H04L 12/28* (2006.01)
*H04W 16/10* (2009.01)
(Continued)

(52) U.S. Cl.
CPC .......... *H04W 16/10* (2013.01); *H04L 41/044* (2013.01); *H04L 41/0816* (2013.01);
(Continued)

(58) Field of Classification Search
CPC . H04W 16/10; H04L 41/5006; H04L 41/0896
See application file for complete search history.

(56) References Cited

U.S. PATENT DOCUMENTS

| 2010/0002921 A1 | 1/2010 | Fenchel et al. |
| 2017/0141973 A1 | 5/2017 | Vrzic |

(Continued)

FOREIGN PATENT DOCUMENTS

| CN | 101399698 A | 4/2009 |
| CN | 102137105 B | 11/2012 |

(Continued)

OTHER PUBLICATIONS

3GPP TS 23.501 V15.3.0 (Sep. 2018), System Architecture for the 5G System.

(Continued)

*Primary Examiner* — Bo Hui A Zhu

(57) ABSTRACT

An aspect of the disclosure provides a method of network slice management performed by a Communication Service Management Function (CSMF). The method includes receiving service requirements and receiving capability exposure information. The method further includes transmitting network slice requirements in accordance with the service requirements and capability exposure information. In some embodiments the capability exposure information is received from a Network Slice Management Function (NSMF). In some embodiments the network slice requirements are transmitted to the NSMF. Other aspects are directed to methods implemented by an NSMF and a Network Sub-Slice Management Function (NSSMF). Other aspects are directed to the network functions themselves.

29 Claims, 23 Drawing Sheets

(51) Int. Cl.
    *H04L 12/24*     (2006.01)
    *H04W 84/04*     (2009.01)

(52) U.S. Cl.
    CPC ...... *H04L 41/0886* (2013.01); *H04L 41/0896* (2013.01); *H04L 41/5006* (2013.01); *H04W 84/042* (2013.01)

(56) References Cited

U.S. PATENT DOCUMENTS

| | | | | |
|---|---|---|---|---|
| 2018/0317134 | A1* | 11/2018 | Leroux | H04L 41/0806 |
| 2018/0332485 | A1* | 11/2018 | Senarath | H04W 24/02 |

FOREIGN PATENT DOCUMENTS

| | | | |
|---|---|---|---|
| CN | 103379227 | A | 10/2013 |
| CN | 106412905 | A | 2/2017 |
| CN | 106550033 | A | 3/2017 |
| CN | 106657194 | A | 5/2017 |
| CN | 106713406 | A | 5/2017 |
| CN | 106850725 | A | 6/2017 |
| WO | 2017076086 | A1 | 5/2017 |

OTHER PUBLICATIONS

3GPP TR 28.801 V15.1.0 (Jan. 2018), Study on management and orchestration of network slicing for next generation network.

S5-164031 Jan Groenendijk, Ericsson,"Minutes for Minutes for Study on Management and Orchestration of Network Slicing",3GPP TSG-SA5 (Telecom Management) SA5#108,Jul. 11-15, 2016, Harbin (China),total 8 pages.

Ericsson: "pCR TR 28 801 Use case and requirements for NSScapability exposure", 3GPP TSG SA WG5 (Telecom Management) Meeting #112; S5-171759,Mar. 25, 2017 (Mar. 25, 2017), Guilin (China); XP051248842,total 14 pages.

Huawei: "Editorial change for use case reorganization", 3GPP TSG SA WG5 (Telecom Management) Meeting #113; S5-173143,May 7, 2017 (May 7, 2017), West Palm Beach, Florida (US); XP051260050,total 9 pages.

3GPP TR 28.801,V1.1.0,"3rd Generation Partnership Project; Technical Specification GroupServices and System Aspects; Telecommunication management;Study on management and orchestration of network slicing for nextgeneration network (Release 14)",Apr. 20, 2017 (Apr. 20, 2017), pp. 1-60,XP051298177,total 60 pages.

* cited by examiner

METHODS AND SYSTEMS FOR NETWORK SLICING

CROSS-REFERENCE TO RELATED APPLICATIONS

This application claims the benefit of priority to U.S. Provisional Patent Application U.S. Patent Application Ser. No. 62/528,824 entitled "Methods and Systems for Network Slicing" filed Jul. 5, 2017 the contents of which are hereby incorporated by reference in their entirety.

FIELD OF THE INVENTION

The present invention generally pertains to the field of Communications Networks, and particular embodiments or aspects relate to Communications Networks which utilize network slicing.

BACKGROUND

Communications networks utilize network slicing to provide logical networks with different and flexible requirements and also high efficiency. Users and service providers create a Service Level Agreement (SLA) to specify the network performance required to meet the user requirements of the user's traffic. Network slices are created by connecting network resources, which meet the network performance specified in the SLA, and provide users with end-2-end communication paths. As the user's requirements change, the network resources included in a slice also change so that the network slice's performance meets the user's requirements. This method is efficient as it ensures that only network resources that meet the user's requirements are included in the network slice used by the user. It should be appreciated that as a user's requirements change, any network resources that exceed the performance required can be reallocated to other network slices and any resources that have less performance than the performance required can be replaced by higher performance resources.

Accordingly, there may be a need for a system and method for responsive network slicing that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

An aspect of the disclosure provides a method of network slice management performed by a Communication Service Management Function (CSMF). The method includes receiving service requirements and receiving capability exposure information. The method further includes transmitting network slice requirements in accordance with the service requirements and capability exposure information. In some embodiments the capability exposure information is received from a Network Slice Management Function (NSMF). In some embodiments the network slice requirements are transmitted to the NSMF. In some embodiments the capability exposure information includes any one of the following: request based information; network slice type information; network slice template (NST) information; NST plus capacity information; and all relevant information. In some embodiments the service requirements are received from a Communication Service Negotiation Function (CSNF). In some embodiments the network slice requirements includes any one of the following: parameters; network slice type plus parameters; network slice template plus parameters; network slice template plus parameters plus capacity; and network slice template plus parameters plus capacity plus other relevant information.

Another aspect of the disclosure provides a method of network slice management performed by a Network Slice Management Function (NSMF). Such a method includes receiving network slice requirements and receiving sub-slice capability exposure information. The method further includes transmitting network sub-slice requirements in accordance with the network slice requirements and capability exposure information. In some embodiments the sub-slice capability exposure information is received from a Network Sub-Slice Management Function (NSSMF). In some embodiments the sub-slice capability exposure information is received from a network element manager. In some embodiments the sub-slice capability exposure information is received from a plurality of network element managers. In some embodiments the sub-slice capability exposure information is received from a MANO. In some embodiments the network sub-slice requirements are transmitted to the NSSMF. In some embodiments the sub-slice capability exposure information includes one of the following: request based information; network sub-slice type information; network sub-slice template (NSST) information; NSST and capacity information; and all relevant information. In some embodiments the network slice requirements are received from a Communication Service Management Function (CSMF). In some embodiments the method further includes transmitting slice capability exposure information to the CSMF. In some embodiments the slice capability exposure information comprises one of the following: request based information; network slice type information; network slice template (NST) information; NST and capacity information; and all relevant information.

Another aspect of the disclosure provides a method of network slice management performed by a Network Sub-Slice Management Function (NSSMF). Such a method includes receiving network sub-slice requirements and receiving sub-slice capability exposure information. The method further includes transmitting aggregated sub-slice capability exposure information. In some embodiments the sub-slice capability exposure information is received from a network element manager. In some embodiments the sub-slice capability exposure information is received from a plurality of network element managers. In some embodiments the sub-slice capability exposure information is received from a MANO. In some embodiments the network sub-slice requirements are received from a Network Slice Management Function (NSMF). In some embodiments the aggregated sub-slice capability exposure information is transmitted to the NSMF. In some embodiments the aggregated sub-slice capability exposure information comprises one of the following: request based information; network sub-slice type information; network sub-slice template (NSST) information; NSST and capacity information; and all relevant information.

Other aspects of the disclosure provide for network elements configured to perform the methods described herein. For example, network elements can be configured as a (B)SM, CSNF, CSMF, NSMF or NSSMF. For example network elements can include a processor, and machine readable memory storing machine readable instructions which when executed by the processor, cause the network element to perform the methods described herein.

For example, other aspects provide a network function including: a network interface for receiving data from and transmitting data to network functions connected to a network; a processor; and a non-transient memory for storing instructions that when executed by the processor cause the network function to be configured to perform the methods described herein.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments of the present invention may provide improved network slicing, effective communication service provisioning, flexible network requirements, and an increase in network efficiency.

BRIEF DESCRIPTION OF THE FIGURES

Further features and advantages of the present invention will become apparent from the following detailed description, taken in combination with the appended drawings, in which:

FIG. 3 also shows Network Slice Instance 30's connectivity to ED 52, which can be a UE, and App Server 200.

FIG. 4 also shows the Network Slice Instance 30's connectivity to an ED 52, which can be a UE, and App Server 200. When the network slice embodiment shown in FIG. 4 is created, the topology is supplied and the resources are allocated based on their function.

FIG. 7 block diagrams illustrate three different embodiments of service instances and Network Slice Instances. The three block diagrams in FIG. 7 illustrate embodiments where multiple service instances (SIs) can share one network slice instance. In this embodiment, SI 1 shares NSI with SI 2. It is also shown in the embodiment that part of the resources in NSI is utilized by SI 1 and part utilized by SI 2.

FIG. 8's block diagram also illustrates Network Resource 1 401 and Network Resource 2 400 allocated within Network Slice Instance 1 37. FIG. 8's block diagram further illustrates the connectivity between the UEs 52 and servers 200 associated with Service Instance 1 46 and Service Instance 2 47 and the shared Network Slice Instance 1 37.

FIG. 9 also shows an embodiment where App Server 225 is located near CN NF 114. FIG. 9 also shows an embodiment where App Server 226 is located close to CN NF 114 and DN 88.

DETAILED DESCRIPTION

Figure 1:
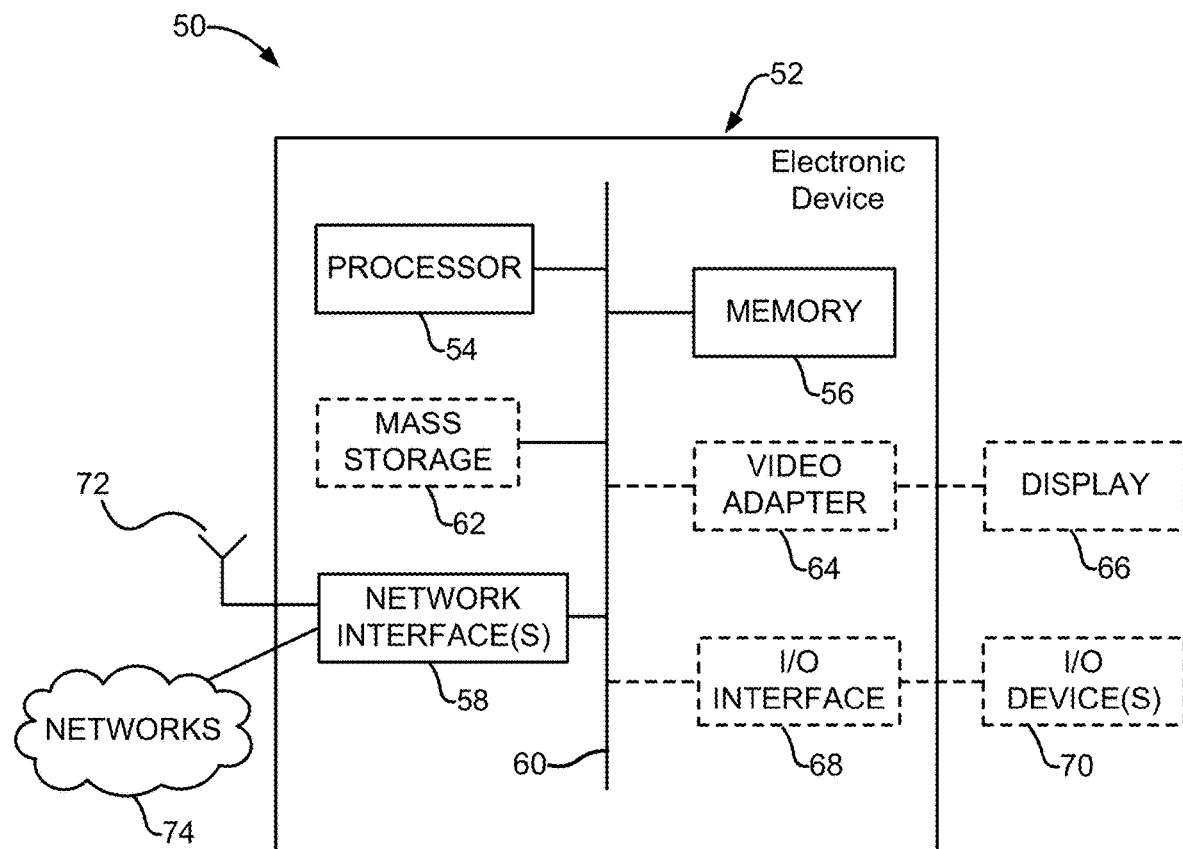
FIG. 1 is a block diagram of an electronic device 52 within a computing and communications environment 50 that may be used for implementing devices and methods in accordance with representative embodiments of the present invention.

In general methods and systems according to embodiments are disclosed which provides for lower levels of functions providing exposure of capabilities to higher level functions. It is noted that exposed/exposure of capabilities in this specification refers to providing capability exposure information. Based on these exposures, higher level functions send service or slice requirements to the lower level functions. In general, the more information which is provided upwards, the more specificity can be specified in the service or slice requirements. This can allow for faster set up times, as the higher level functions can determine which functions can satisfy the service or slice requirements. However, security considerations can provide reasons for operators to limit the amount of information which is provided. For example, if little or no information is provided, then the higher level functions cannot determine which lower functions can satisfy a request. This can lead to multiple requests or iterations of requests being sent to multiple functional entities to determine which functional entities are able to configure slices to satisfy the service or slice requirements.

Some terminology will now be discussed. In some embodiments a network slice is a logical network that provides specific network capabilities and network characteristics. In some embodiments a network slice is a complete logical network that provides specific network capabilities and network characteristics and serves a certain business purpose. In some embodiments a Network Slice Instance is a set of Network Function instances and the required resources (e.g. compute, storage and networking resources) which form a deployed Network Slice. In some embodiments a Network Slice Instance is a set of network functions and the resources for these network functions which are arranged and configured, forming a complete logical network to meet certain network characteristics and serve certain business purpose. In some embodiments a Network Slice Instance is a set of network functions, and resources to run these network functions, forming a complete instantiated logical network to meet certain network characteristics required by the Service Instance(s).

In some embodiments a Network slice subnet instance is a set of network functions and the resources for these network functions which are arranged and configured to support the formation of a network slice instance. In some embodiments a Network slice subnet instance is a set of network functions and the resources for these network functions which are arranged and configured to be used as a constituent of one or more network slice instances. It is noted that subnet and subslice are used interchangeably herein. In some embodiments a Service Instance is an instance of an end-user service or a business service that is realized within or by a network slice. In some embodiments a service Instance is an instance of an end-user service or a business service consisting of a certain set of communication services that are realized within or by a network slice. In some embodiments Service Instance is an instance of an end-user service or a business service that is realized within or by a network slice.

Examples of when a Network Service Instance (NSI) is complete will be discussed, according to embodiments:
1) Completeness of an NSI A NSI is complete in the sense that it includes all functionalities and resources necessary to support certain set of communication services thus serving certain business purpose.

2) Components of an NSI

The NSI contains network functions (NFs) (e.g. belonging to access node (AN) and core network (CN).

If the NFs are interconnected, the 3GPP management system contains the information relevant to connections between these NFs such as topology of connections, individual link requirements (e.g. quality of service (QOS) attributes), etc.

For the part of the Transport Network (TN) supporting connectivity between the NFs, the 3GPP management system provides link requirements (e.g. topology, QoS attributes) to the management system that handles the part of the TN supporting connectivity between the NFs.

FIG. 1 is a block diagram of an electronic device (ED) 52 illustrated within a computing and communications environment 50 that may be used for implementing the devices and methods disclosed herein. In some embodiments, the ED 52 may be an element of communications Network Instance, such as a base station (for example a NodeB, an evolved Node B (eNodeB, or eNB), a next generation NodeB (sometimes referred to as a gNodeB or gNB), a home subscriber server (HSS), a gateway (GW) such as a packet gateway (PGW) or a serving gateway (SGW) or various other nodes or functions within a core network (CN) or a Public Land Mobility Network (PLMN). In other embodiments, the electronic device may be a device that connects to the Network Instance over a radio interface, such as a mobile phone, smart phone or other such device that may be classified as a User Equipment (UE). In some embodiments, ED 52 may be a Machine Type Communications (MTC) device (also referred to as a machine-to-machine (m2m) device), or another such device that may be categorized as a UE despite not providing a direct service to a user. In some references, ED 52 may also be referred to as a mobile device, a term intended to reflect devices that connect to mobile network, regardless of whether the device itself is designed for, or capable of, mobility. Specific devices may utilize all of the components shown or only a subset of the components. Levels of integration may vary from device to device. Furthermore, a device may contain multiple instances of a component, such as multiple processors, memories, transmitters, receivers, etc. ED 52 typically includes a processor 54, such as a Central Processing Unit (CPU), and may further include specialized processors such as a Graphics Processing Unit (GPU) or other such processor, a memory 56, a network interface 58 and a bus 60 to connect the components of ED 52. ED 52 may optionally also include components such as a mass storage device 62, a video adapter 64, and an I/O interface 68 (shown in dashed lines).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

ED 52 may also include one or more network interfaces 58, which may include at least one of a wired network interface and a wireless network interface. As illustrated in FIG. 1, network interface 58 may include a wired network interface to connect to a network 74, and also may include a radio access network interface 72 for connecting to other devices over a radio link. When ED 52 is an element of a communications Network Instance element, the radio access network interface 72 may be omitted for nodes or functions acting as elements of the PLMN other than those at the radio edge (e.g. an eNB). When ED 52 is element of a communication Network Instance and is located at the radio edge of a network, both wired and wireless network interfaces may be included. When ED 52 is a device that connects to the Network Instance over a radio interface wirelessly, such as a User Equipment, radio access network interface 72 may be present and it may be supplemented by other wireless interfaces such as WiFi network interfaces. The network interfaces 58 allow ED 52 to communicate with remote entities such as those connected to network 74.

The mass storage 62 may comprise any type of non-transitory storage device configured to store data, programs, and other information and to make the data, programs, and other information accessible via the bus 60. The mass storage 62 may comprise, for example, one or more of a solid state drive, hard disk drive, a magnetic disk drive, or an optical disk drive. In some embodiments, mass storage 62 may be remote to ED 52 and accessible through use of a network interface such as network interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed lines) provide interfaces to couple ED 52 to external input and output devices. Examples of input and output devices include a display 66 coupled to the video adapter 64 and an I/O device 70 such as a touch-screen coupled to the I/O interface 68. Other devices may be coupled to ED 52, and additional or fewer interfaces may be utilized. For example, a serial interface such as Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, ED 52 may be a standalone device, while in other embodiments ED 52 may be resident within a data center. A data center, as will be understood in the art, is a collection of computing resources (typically in the form of servers that include compute resources (e.g., CPUs), and storage resources (e.g., persistent storage) that can be used as a collective computing resource. Within a data center, a plurality of servers can be connected together to provide a computing resource pool upon which virtualized entities can be instantiated. Data centers can be interconnected with each other to form networks consisting of pools computing resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing and connectivity resources (along with other resources within the network) can be divided between different sub-networks, in some cases in the form of a resource slice. If the computing resources across a number of connected data centers or other collection of nodes are sliced, different network slices can be created.

Figure 2:
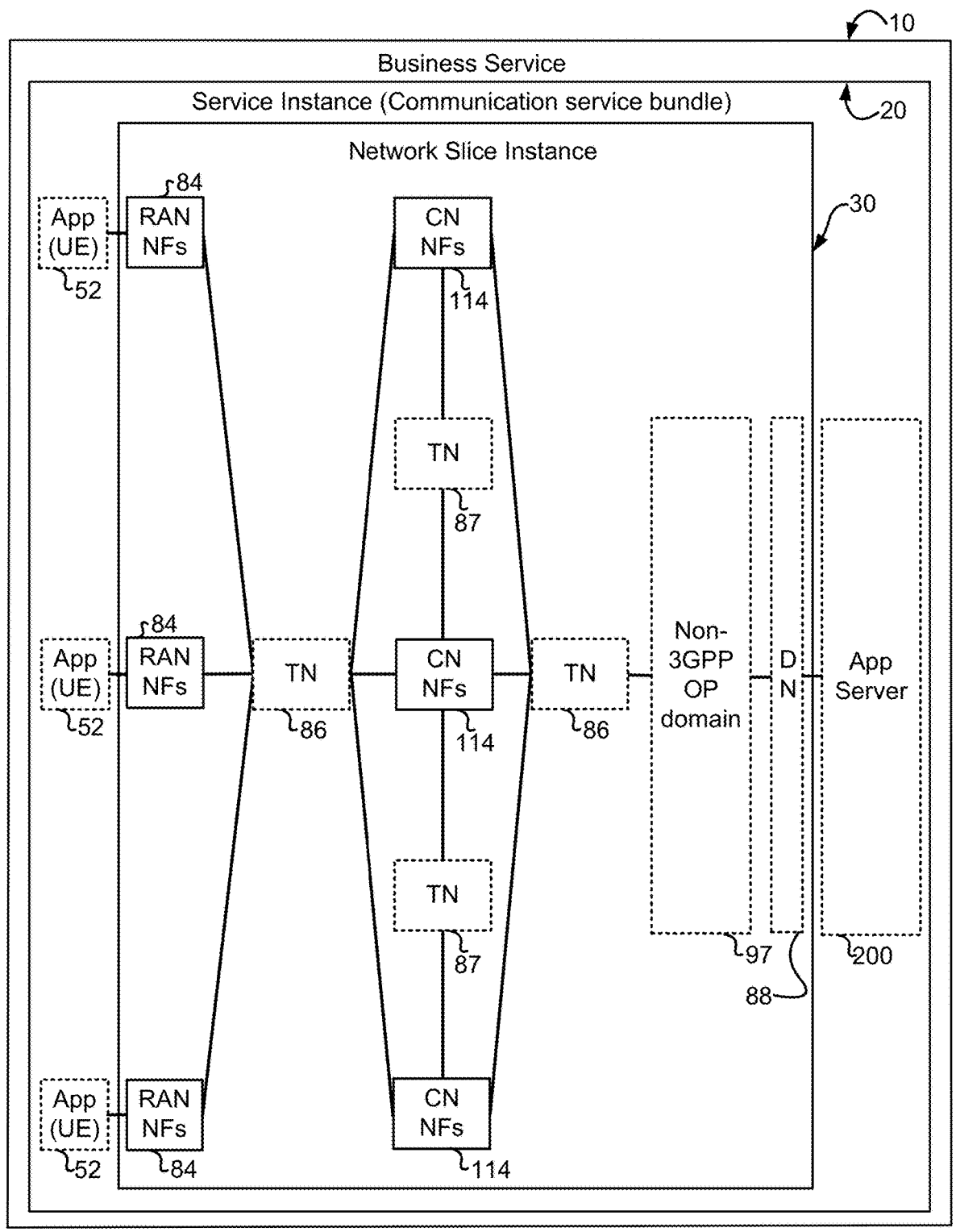
FIG. 2 is a block diagram illustrating a Network Slice Instance 30 in relation to a Service Instance (Communication service bundle) 20, and a Business Service 10 for an embodiment.

An end-to-end network slice facilitates business service by allocating the network resources in the network slice based on the user requirements specified by the customer's Service Level Agreement (SLA). Resources are allocated based on the network slice requirements, and the network slice requirements are created from the SLA's service requirements. FIG. 2 illustrates an embodiment with a Network Slice Instance (NSI) 30, in relation to the Service Instance 20 and the Business Service 10 instance. The NSI 30, can include functions managed by the 3GPP management system. Functions managed by the 3GPP management system are illustrated in FIG. 2 with solid lines and functions not managed by 3GPP management system are illustrated with dotted lines. The radio access network (RAN) NF 84 and CN NF 114 are managed by the 3GPP management system. Network Slice Instance 30 in this embodiment includes RAN NF 84 connected to Transport Network (TN) 86. TN 86 is a function outside of 3GPP, which includes an optical network and can be considered a user plane (UP) function, that routes traffic to a plurality of CN NFs 114. The traffic then passes thorough TN 86 and into non-3GPP OP domain 96 before entering Data Network (DN) 88. The slice is terminated by an Application (App) Server 200 which is the destination of the traffic. Accordingly a service instance allows for communication between an Application (App) executing on the UE, which can take the form of the ED 52 of FIG. 1, and the App Server 200.

TN 87 is a function outside of 3GPP that routes traffic between a plurality of CN NFs 114. It should be appreciated that TN 87 can include an optical network and can also be a core network function.

Figure 3:
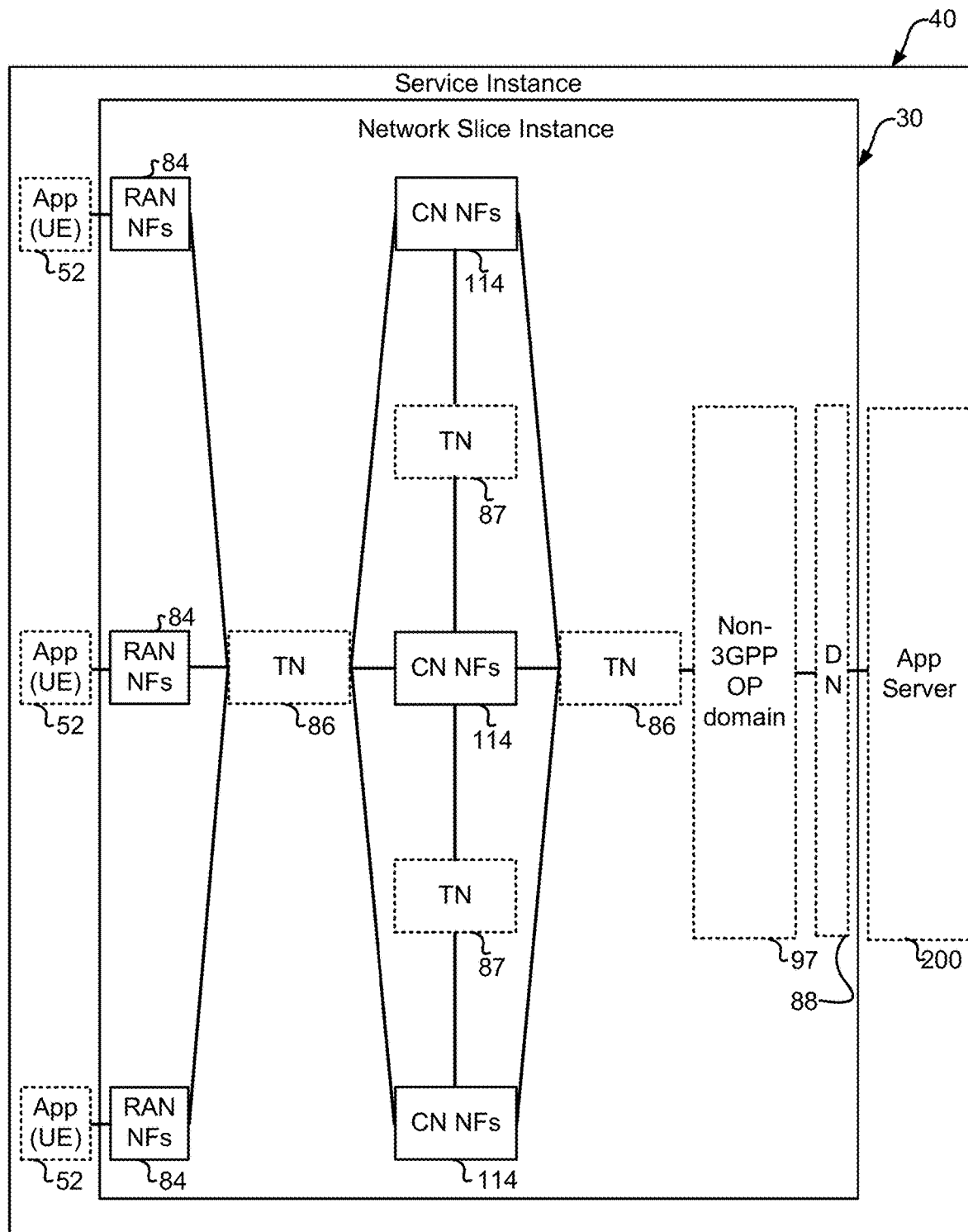
FIG. 3 is a block diagram illustrating a Network Slice Instance 30 instantiated within Service Instance 40 for an embodiment.

FIG. 3 is a block diagram illustrating an embodiment where NSI 30, with support from non-3GPP OP domain, is instantiated within Service Instance 40. The topology of the network functions is determined when devices attach to the NSI 30 (via RAN 84). Network resources are allocated in this embodiment based on their function.

Figure 4:
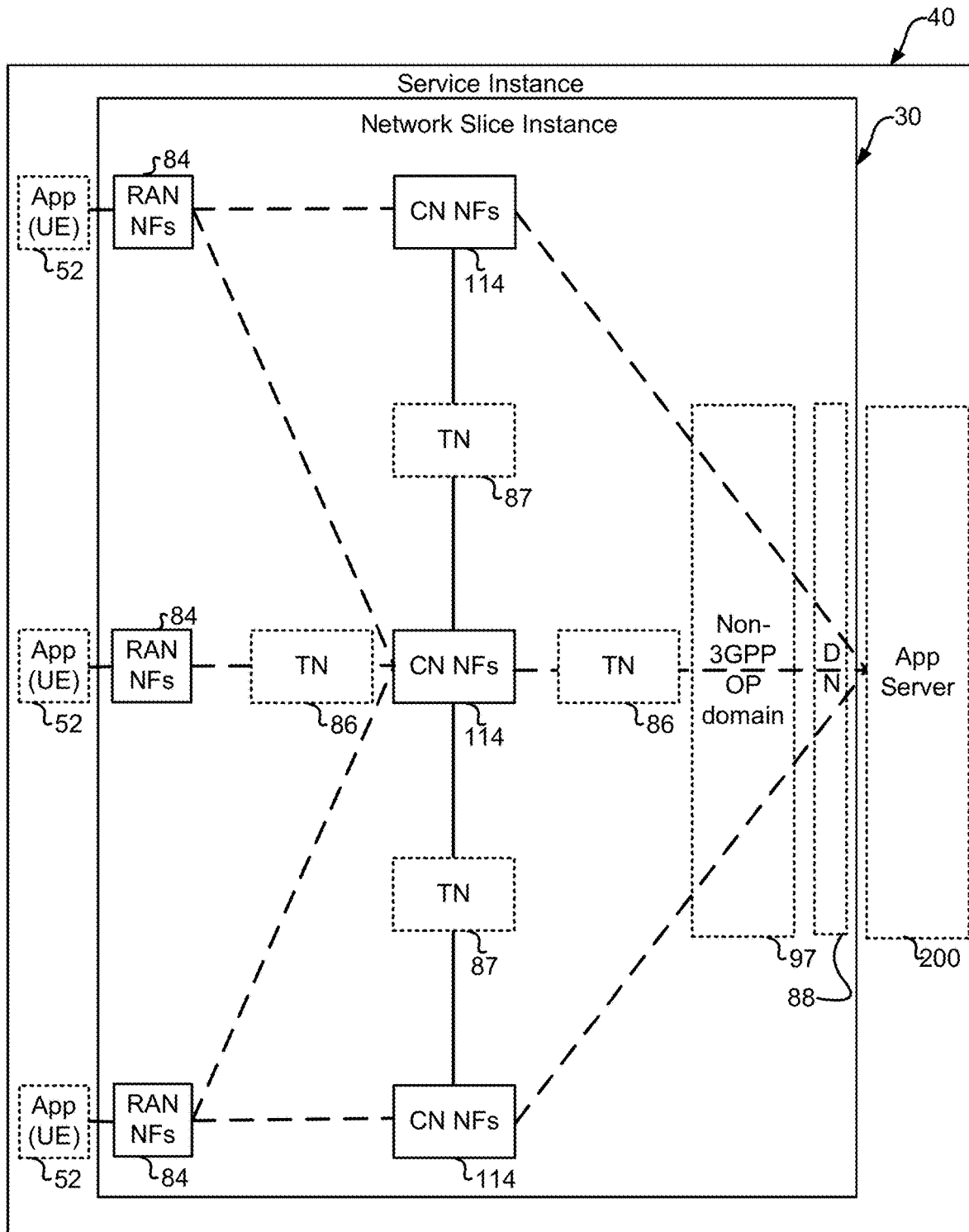
FIG. 4 is a block diagram illustrating an embodiment where Network Slice Instance 30, supporting OP domain that are non-3GPP compliant, instantiated within Service Instance 40 for an embodiment.

FIG. 4 is a block diagram illustrating an embodiment where the topology of the network functions is specified and network functions are allocated based on their function. The topologies of network functions RAN NF 84 and CN NF 114 are defined by the 5G Operation, Administration, and Management (OAM). However the link capacity is not defined by 5G OAM.

Figure 5:
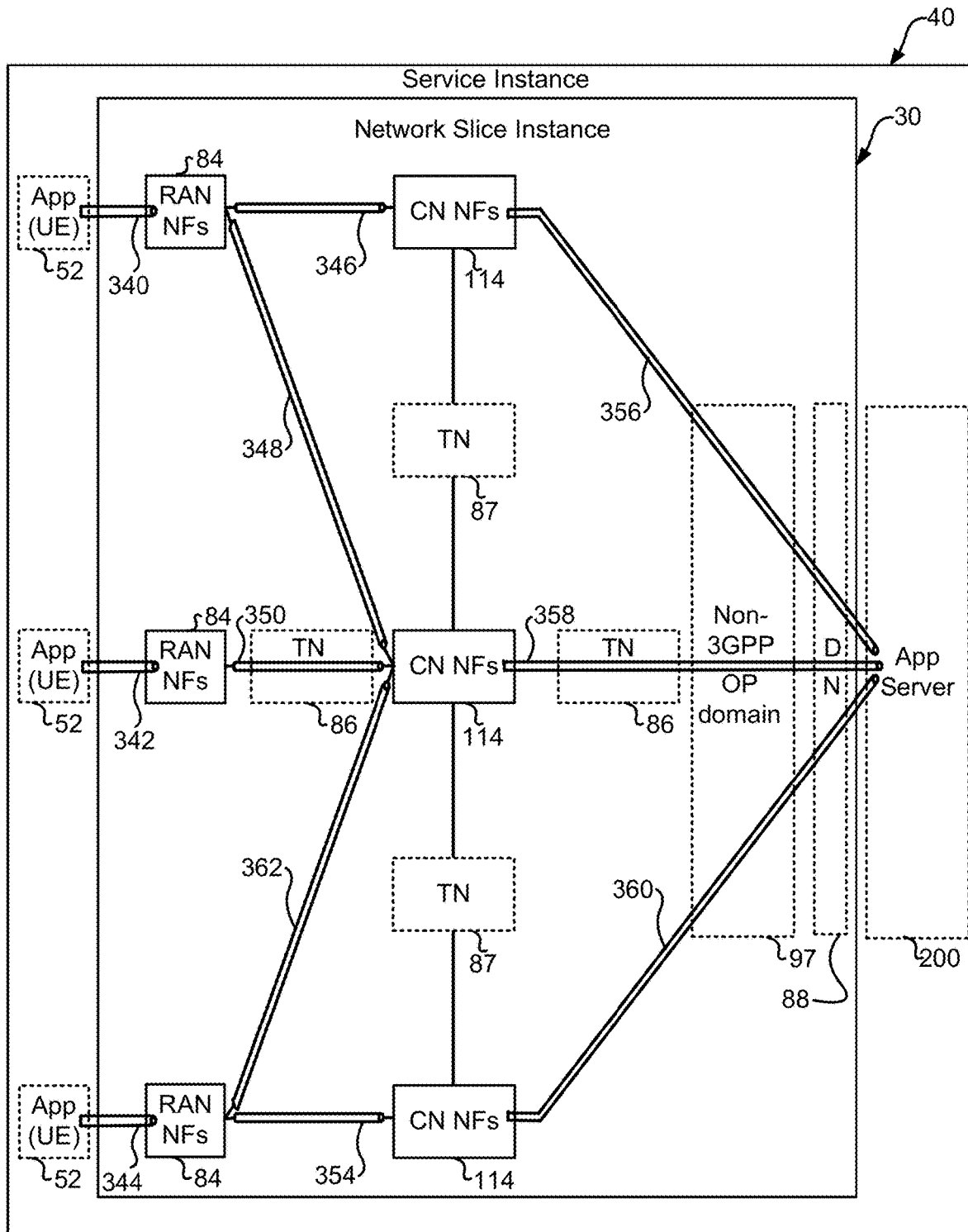
FIG. 5 is a block diagram illustrating Network Slice Instance 30 instantiated within Service Instance 40 for an embodiment. The block diagram shown in FIG. 5 also illustrates the use of connectivity resources to connect network functions, UE 52, and App Server 200. When the network slice embodiment shown in FIG. 5 is created, the topology is supplied, the capacity of the connections is specified, and the resources are allocated based on their function.

FIG. 5 is a block diagram illustrating an embodiment where the network functions (NFs) are connected by connectivity resources. This embodiment shows Service Instance 40, UEs 52 connected to a plurality of RAN NFs 84 via Connectivity Resources 340, 342, and 344. The plurality of RAN NFs 84 are connected to a plurality of CN NFs 114 via Connectivity Resource 346, 348, 350, 362, and 354. The plurality of CN NFs 114 are then connected to App Server 200 via Connectivity Resource 356, 358, and 360. In this embodiment, the topologies of the network functions as well as the capacities of each link are defined by the 5G OAM. Network resources are also allocated based on their function in this embodiment.

Figure 6:
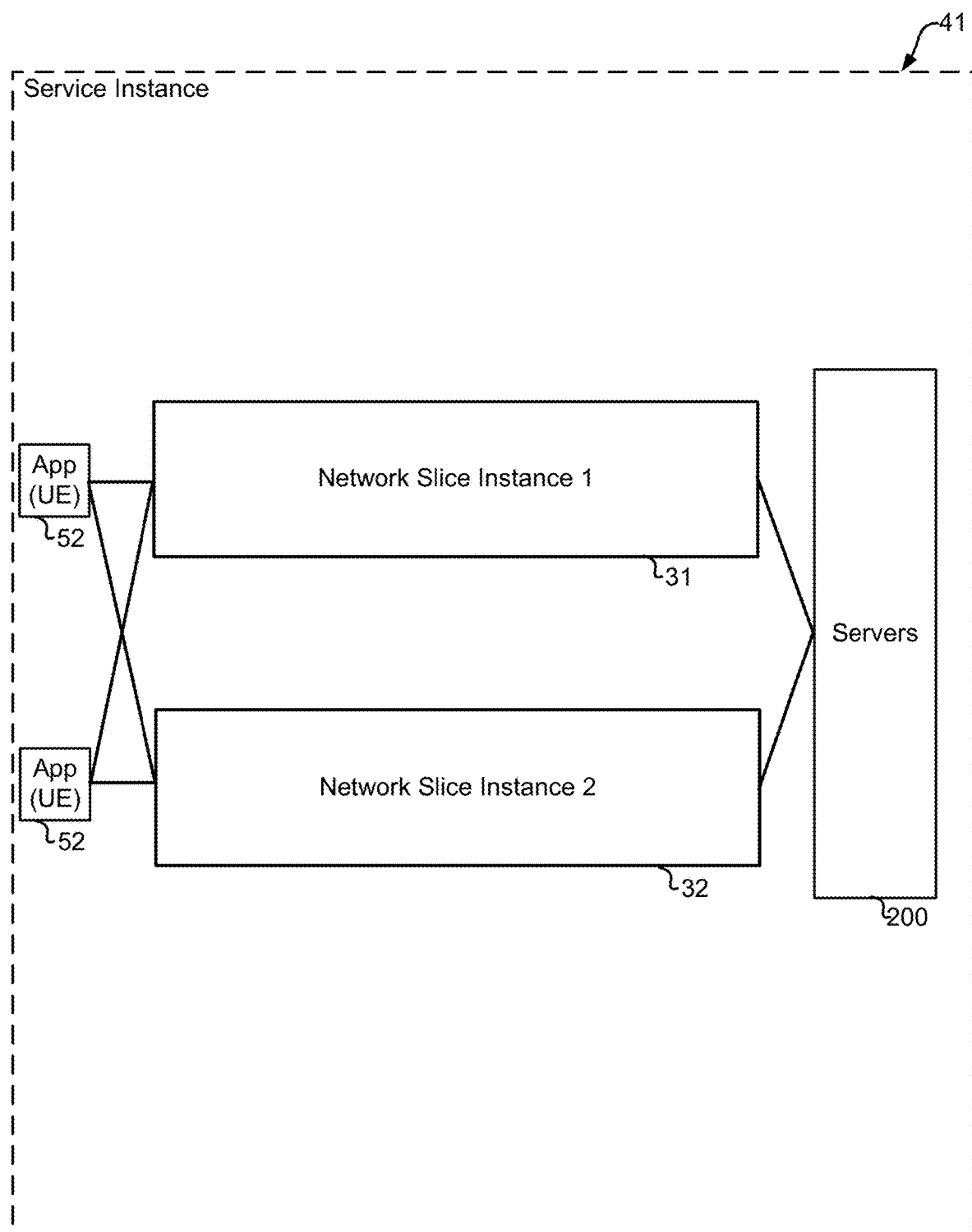
FIG. 6 is a block diagram illustrating the instantiation and connectivity of Network Slice Instance 1 31, Network Slice Instance 2 32, ED 52, which can be a UE, and Servers 200 within Service Instance 41 for an embodiment.

FIG. 6 is a schematic diagram illustrating an embodiment where one Service Instance 41 is supported by multiple Network Slice Instances. In the embodiment shown, UEs, which can take the form of the EDs 52 of FIG. 1, can pass traffic to both or either Network Slice Instance 1 31 or Network Slice Instance 2 32. This embodiment also shows Network Slice Instance 1 31 and Network Slice Instance 2 32 passing traffic to the same App Server 200. Although FIG. 6 illustrates an embodiment in which one Service instance is supported by two Network Slice Instances, in alternative embodiments, Service Instances can include several Network Slice Instances to provide different levels of service or redundancy. In some embodiments one service application (executing in a UE) can be connected by multiple Network Slice Instances to a corresponding App Server 200.

Figure 7A:
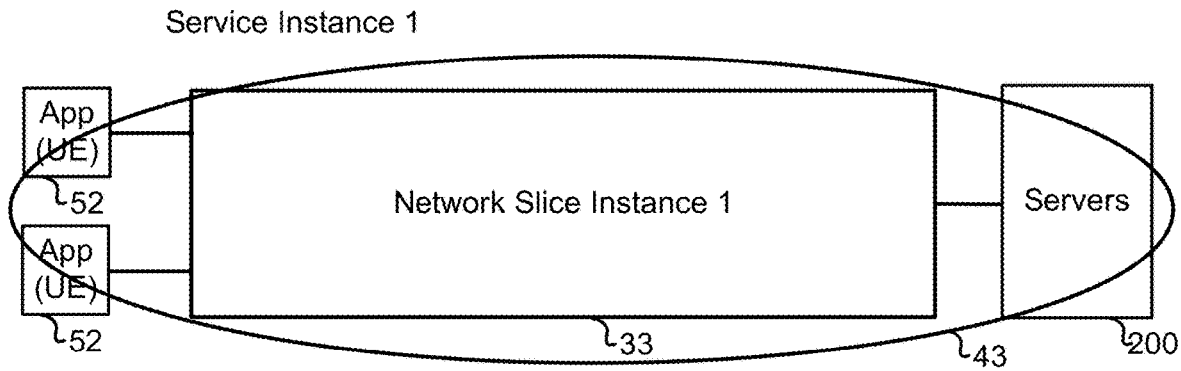
FIG. 7A illustrates a first embodiment showing a single instance.
Figure 7B:
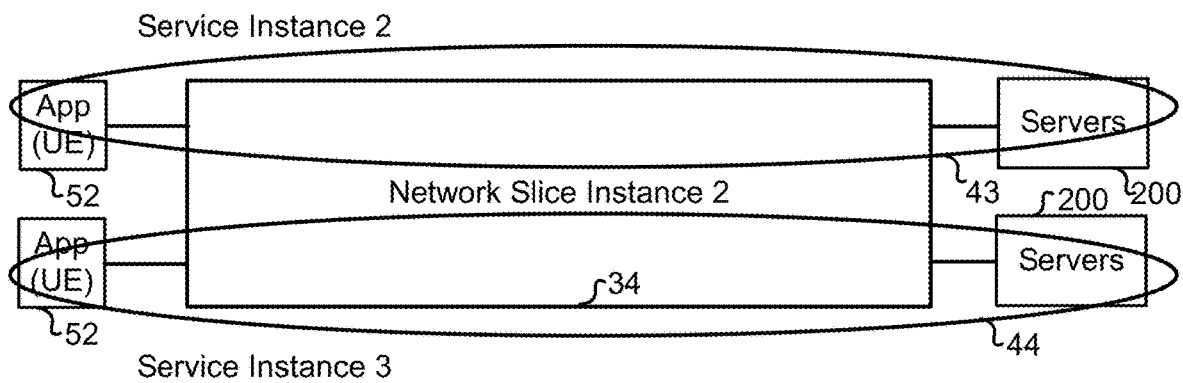
FIG. 7B illustrates a second embodiment showing multiple instances.
Figure 7C:
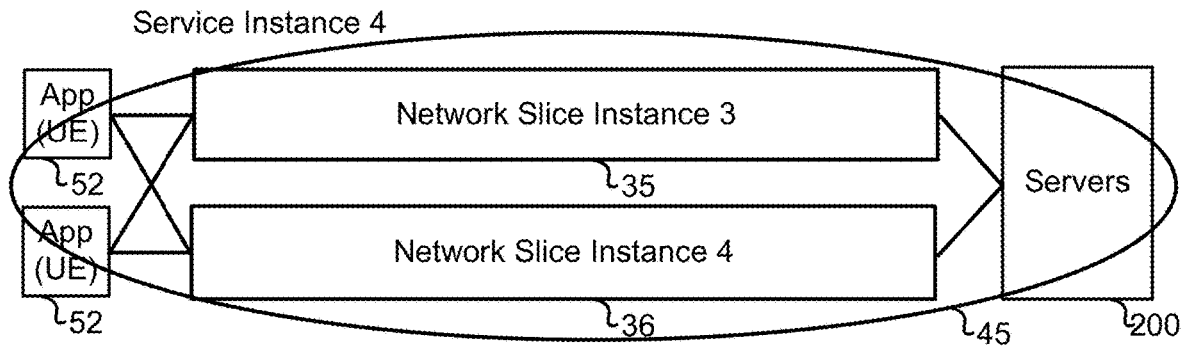
FIG. 7C illustrates another embodiment in which a single instance of App Server 200 is served by a plurality of Network Slice Instances.

FIGS. 7A, 7B, and 7C illustrate several embodiments where a Service Instance includes a single instance of App Servers 200, a plurality of Service Instances include a plurality of instances of Servers 200, and a single Service Instance, which is composed of a plurality of Network Slice Instances, also includes a single instance of App Server 200. FIG. 7A illustrates a first embodiment in which a single instance of App Server 200 is served by a single Service Instance 1 43 and a single Network Slice Instance 1 33 and also a plurality of UEs 52. FIG. 7B illustrates a second embodiment in which multiple instances of App Server 200 are served by multiple Service Instances (Service Instance 2 43 and Service Instance 3 44) and a single Network Slice Instance 2 34 and also a plurality of UEs, which can be 52. FIG. 7C illustrates another embodiment in which a single instance of App Server 200 is served by a plurality of Network Slice Instances (Network Slice Instance 3 35 and Network Slice Instance 4 36) as well as a single Service Instance 4 45 and also a plurality of UEs 52.

Figure 8:
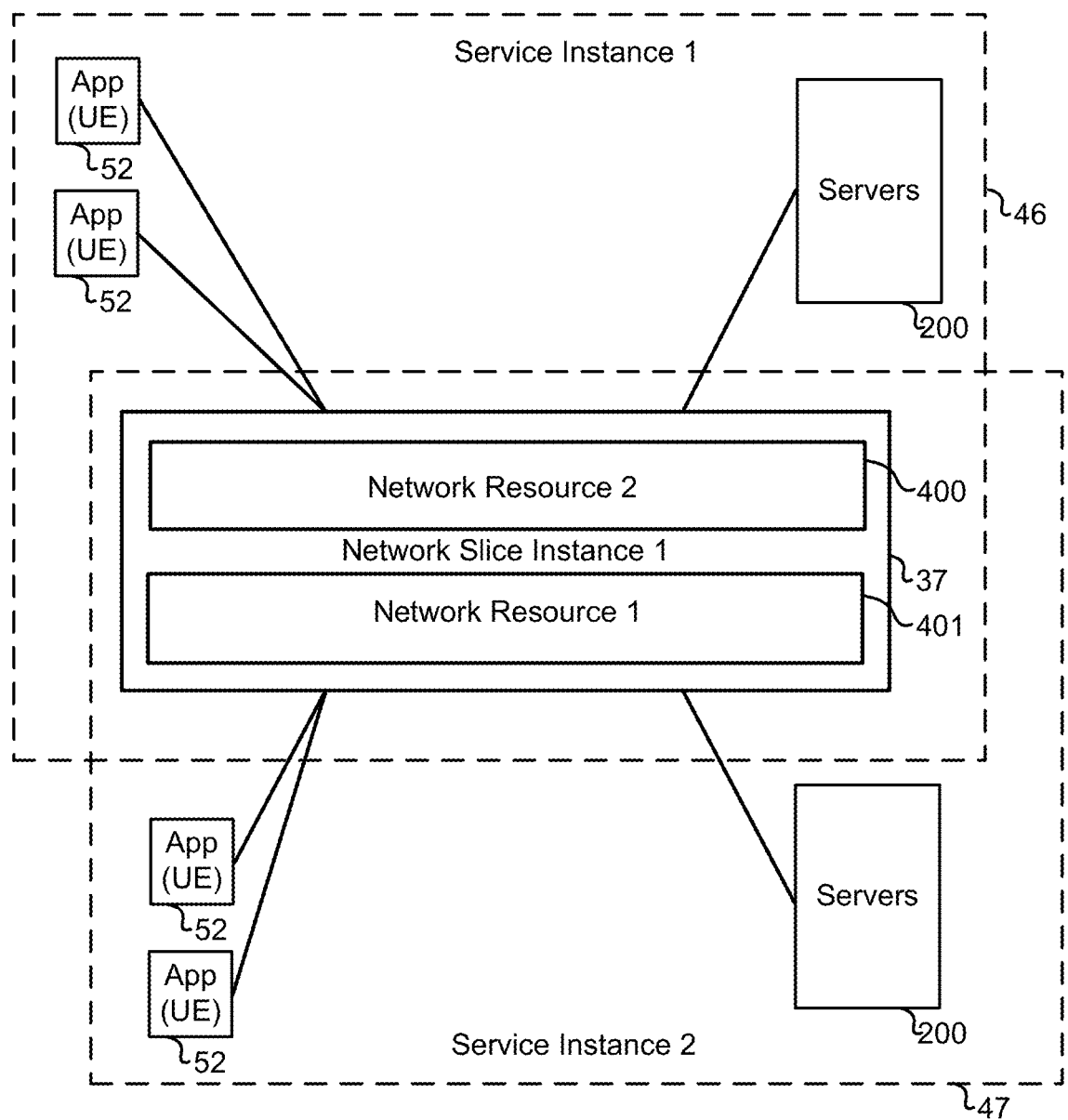
FIG. 8 is a block diagram illustrating two service instances (Service Instance 1 46 and Service Instance 2 47) both sharing Network Slice Instance 1 37 for an embodiment.

FIG. 8 illustrates an embodiment where a Network Slice Instance includes network resources allocated to a plurality of Service Instances. The embodiment illustrated in FIG. 8 includes network resources from a plurality of Service Instances when network resources required are unavailable otherwise. In this embodiment, both Service Instance 1 46 and Service Instance 2 47 share Network Slice Instance 1 37. Service Instance 1 46's, EDs 52 (which are UEs), and App Server 200 connect to Network Slice Instance 1 37 in this embodiment. Also in this embodiment, Service Instance 2 47's, EDs 52 (which are UEs) and Server 200 connect to Network Slice Instance 1 37. Network Slice Instance 1 37 in this embodiment includes the resources allocated to Service Instance 1 46 as Network Resource 2 400 and the network resources allocated to Service Instance 2 47 as Network Resource 1 401.

Figure 9:
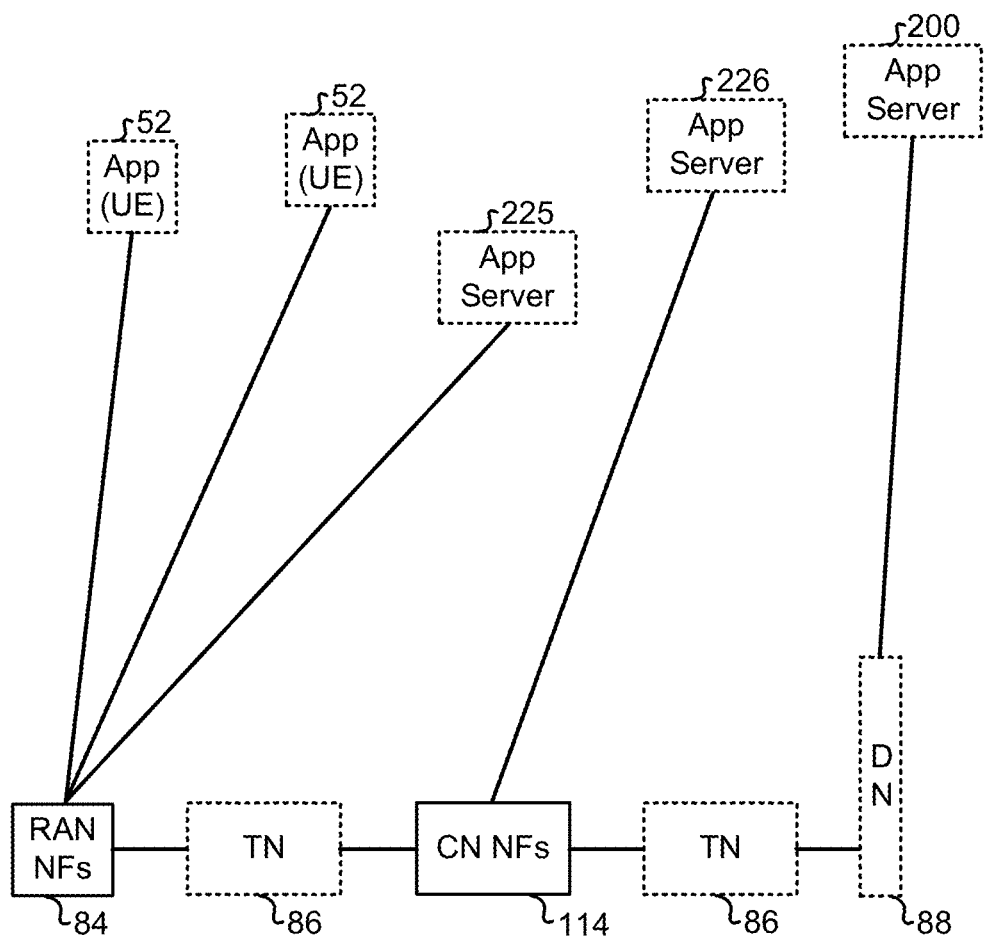
FIG. 9 is a block diagram illustrating an embodiment where the Network Slice Instance 39's RAN NF 84 is located close to the App Server 200.

FIG. 9 illustrates that the in some embodiments, an App Server 225 can be instantiated close to the RAN NF 84. In other embodiments, the App Server 226 can be instantiated close to the CN NF 114. In some other embodiments, the App server 200 can be close to the DN 88. In some embodiments, the App Server 225 and App Server 226 functionality can be instantiated within the network functions 84 and 114 respectively.

Although a single App Server 200 is illustrated in FIGS. 2-9, in alternative embodiments, App Server 200 may include a plurality of servers.

Figure 10:
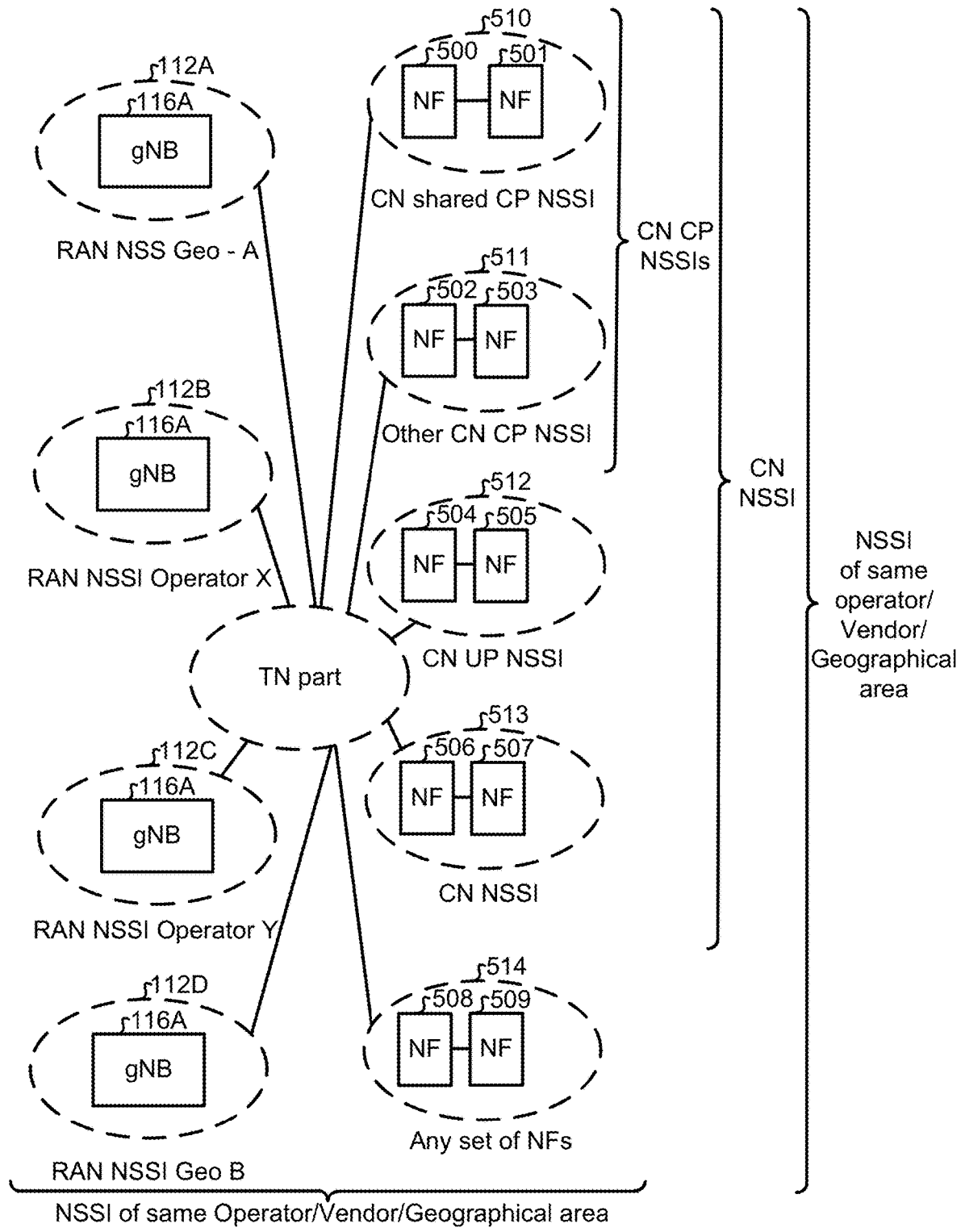
FIG. 10 is a block diagram illustrating many different embodiments of Network Slice Subnet Instances (NSSI) that can be used to create a Network Slice Instance (NSI).

FIG. 10 illustrates several Network Slice Subnet Instances (NSSI) which can be combined to form a Network Slice Instance (NSI), according to an embodiment. A NSSI is a set of network functions and network function resources that can be combined and managed by the Network Sub-Slice Management Function (NSSMF). The network functions can be grouped based on their administrative domains, set of network functions that serve a specific purpose, that belong to a certain technology group, are located in a certain geographic area, or by vendor. The NSSI include RAN network functions including the RAN NSS Geo—A 112A, RAN NSSI Operator X 112B, RAN NSSI Operator Y 112C, and RAN NSSI Geo B 112D—all of which include next generation node B (gNB) 116A. The NSSI also can include CN shared CP NSSI 510 (which instantiates NF 500 and 501), Other CN CP NSSI 511 (which instantiates NF 502 and 503), CN UP NSSI 512 (which instantiates NF 504 and 505), CN NSSI 513 (which instantiates NF 506 and 507), and any set of NFs 514 (which instantiates NF 508 and 509).

Figure 11:
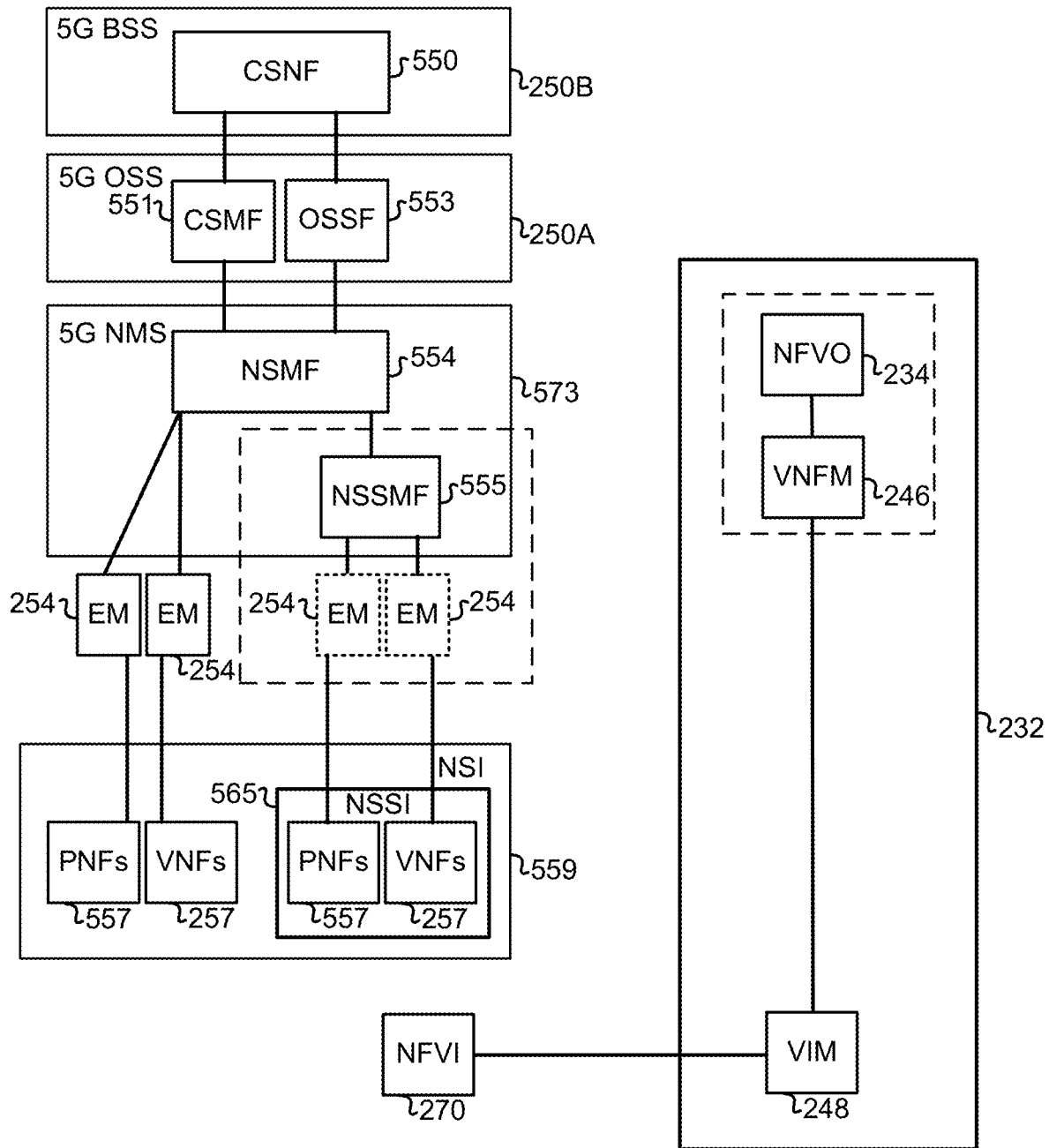
FIG. 11 is a block diagram illustrating an embodiment for a network slice management architecture for a single administrative domain.

FIG. 11 illustrates an embodiment of a network slice management architecture used by a single administrative domain. This embodiment of the network slice management architecture includes a 5G Business Support Service (BSS) 250B comprised of a Communication Service Network Function (CSNF) 550, a 5G Operations Support System (OSS) 250A that requires the instantiation of a Communication Service Management Function (CSMF) 551 and also an Operations Service Support Function (OSSF) 553. This embodiment of the network slice management architecture also includes a 5G Network Management System (NMS) 573 that implements a Network Slice Management Function (NSMF) 554 which allows a service provider to manage the lifecycle and capacity of a network slice. The NSMF 554 is implemented with a high-level of abstraction based on network function name (NF ID), capability, and topology. The 5G NMS 573 also instantiates a Network Sub-Slice Management Function (NSSMF) 555 that resides at the same hierarchical level as the Element Manager (EM)/DM to which it is connected (EM 254). The NSMF 554 manages the network function using the NSSMF 555. This embodiment of the network slice management architecture also includes an instantiation of a Network Slice Instance 559 which instantiated a Network Slice Subnet Instance 565 (which instantiated Physical Network Function (PNF) 557 and Virtual Network Function (VNF) 257). This embodiment of the network slice management architecture also includes a Management and Network Orchestrator (MANO) 232 which instantiated a Network Function Virtual Orchestrator (NFVO) 234, Virtual Network Functional Manager (VNFM) 246 and Virtual Instance Manager (VIM) 248. Lastly, the embodiment of the network slice management architecture illustrated in FIG. 11 includes an instantiation of a Network Function Virtualization Instance (NFVI) 270.

Figure 12:
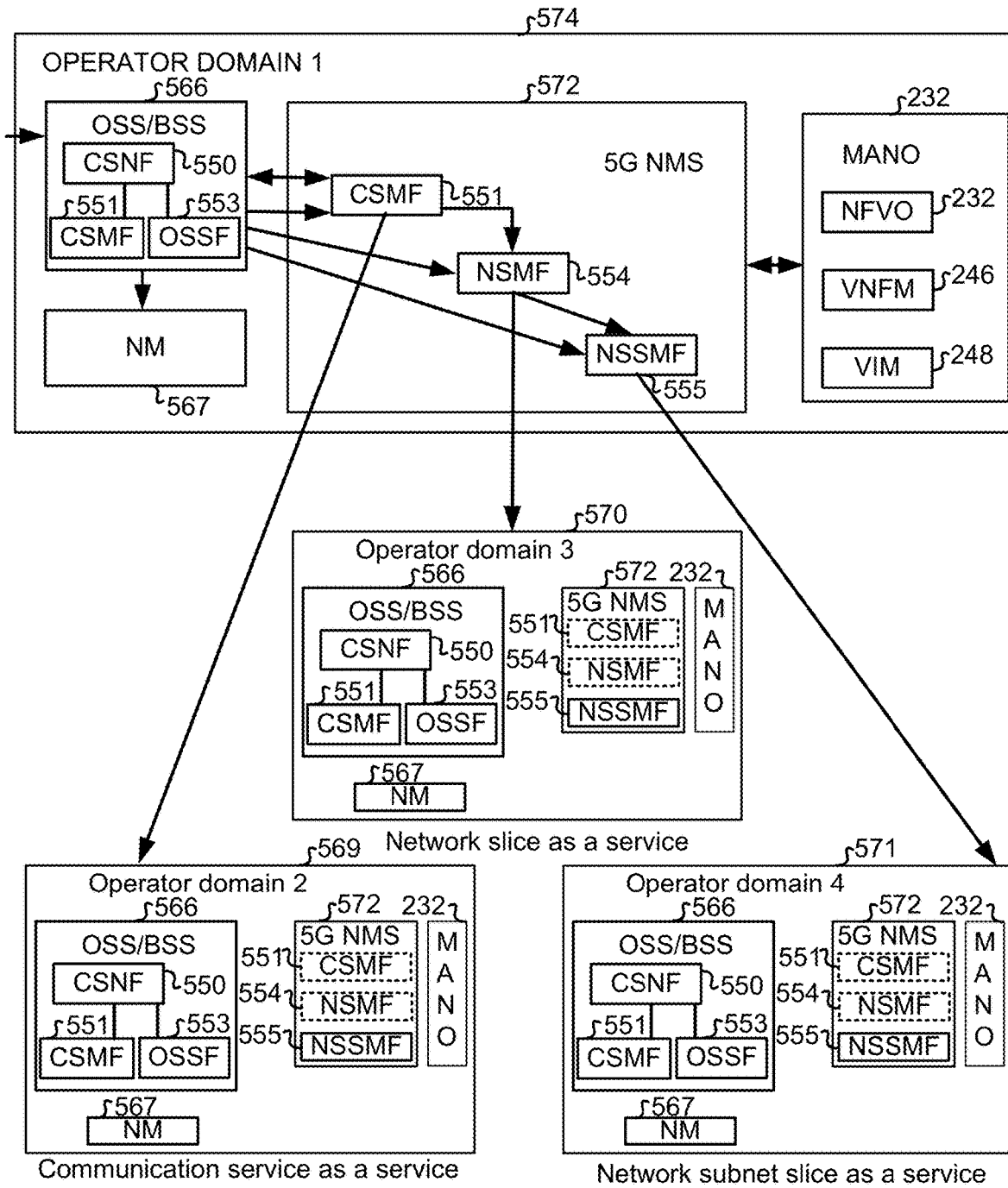
FIG. 12 is a block diagram illustrating an embodiment of a network slice management architecture where the unused resources of slices is included in another slice.

FIG. 12 is a block diagram illustrating the embodiment of a network slice management architecture for multiple administrative domains. In this embodiment of the network slice management architecture, Operator Domain 1 574 includes network resources from Operator domain 2 569, Operator Domain 3 570, and Operator Domain 4 571. Operator Domain 1 574 is comprised of a 5G NMS 572 (which instantiates CSMF 551, NSMF 554, and NSSMF 555), OSS/BSS 566 (which instantiates CSNF 550, CSMF 551, and OSSF 553), NM 567, and MANO 232 (which also instantiates NFVO 234, VNFM 246, and VIM 248). Operator domain 2 569, Operator domain 3 570, and Operator domain 4 571 are each comprised of an OSS/BSS 566 (which instantiates CSNF 550, CSMF 551, and OSSF 553), NM 567, 5G NMS 572 (which instantiates CSMF 551, NSMF 554, and NSSMF 555) and MANO 232. Operator domain 2 is configured to allow communication service as a service. Operator domain 3 is configured to allow network slice as a service. Operator domain 4 is configured to allow network subnet slice as a service.

Figure 13:
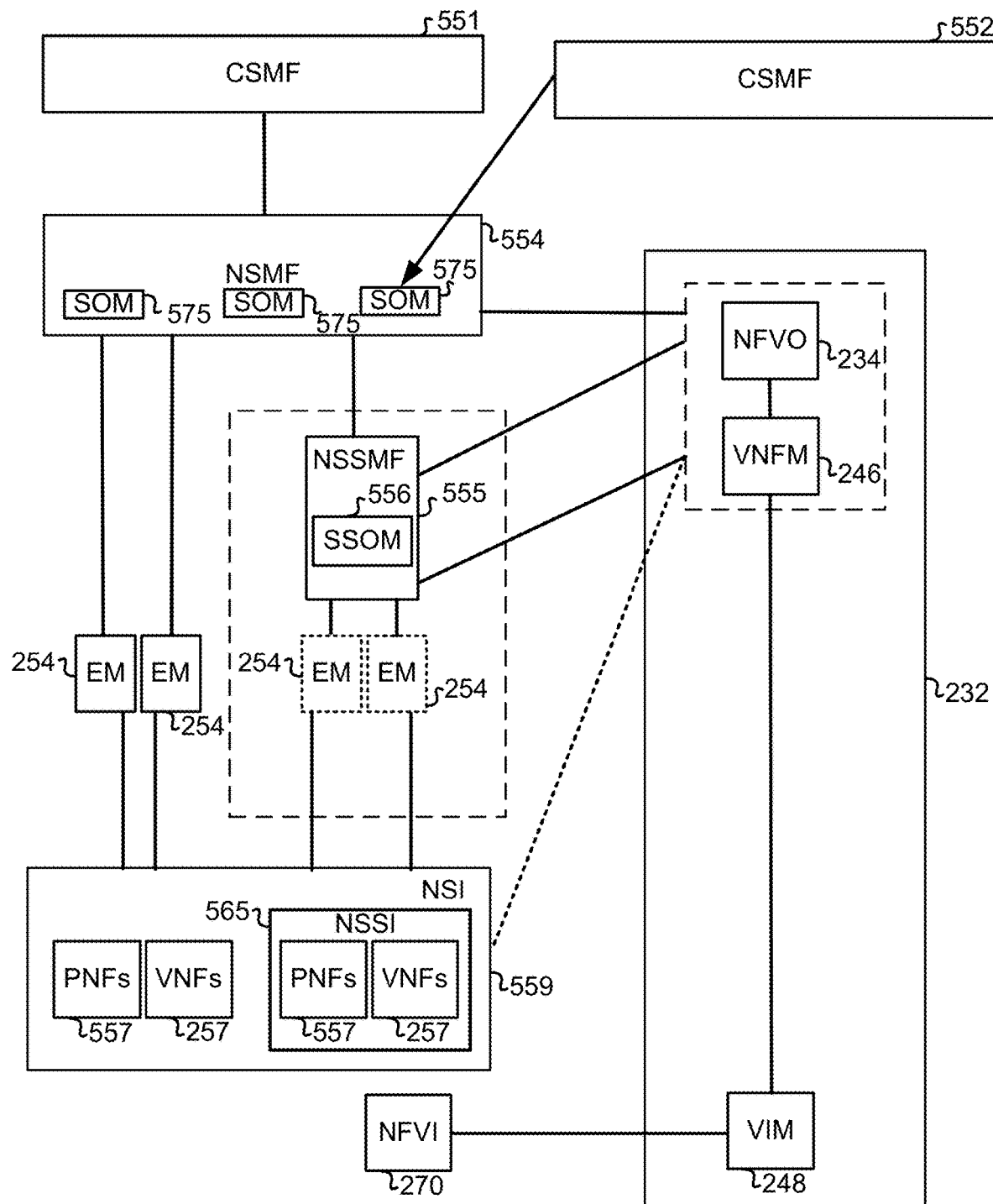
FIG. 13 is a block diagram illustrating an embodiment of a network slice management architecture that is specifically designed to manage slices.

FIG. 13 illustrates an embodiment of a network slice management architecture used to manage multiple slices. This embodiment of the network slice management architecture includes CSMF 551 that communicates with NSMF 554 and CSMF 552 that communicates with Slice Operation Manager (SOM) 575. A SOM is instantiated for each NSI as each SOM manages one network slice. Similarly, the network slice management architecture includes a Subnet Slice Operation Manager (SSOM) 556 in the NSSMF 555. The NSMF 554 is implemented with a high-level of abstraction based on network function name (NF ID), capability, and topology. The Network Sub-Slice Management Function (NSSMF) 555 resides at the same hierarchical level as the EM 254 to which it is connected to. The NSMF 554 manages the network function using the NSSMF 555. This embodiment of the network slice management architecture also includes an instantiation of a Network Slice Instance 559 which instantiated a Network Slice Subnet Instance 565 (which instantiated Physical Network Function (PNF) 557 and Virtual Network Function (VNF) 257). This embodiment of the network slice management architecture also includes a MANO 232 which instantiated a Network Function Virtual Orchestrator (NFVO) 234, Virtual Network Functional Manager (VNFM) 246 and Virtual Instance Manager (VIM) 248. In this embodiment of the network slice management architecture, the NFVO 234 can communicate with NSMF 554 and also NSSMF 555. VNFM 246 can communicate with EM 254 and also directly with VNF 257. Lastly, the network slice management architecture embodiment instantiated a Virtual Network Function Instance (VNFI) 270.

Figure 14A:
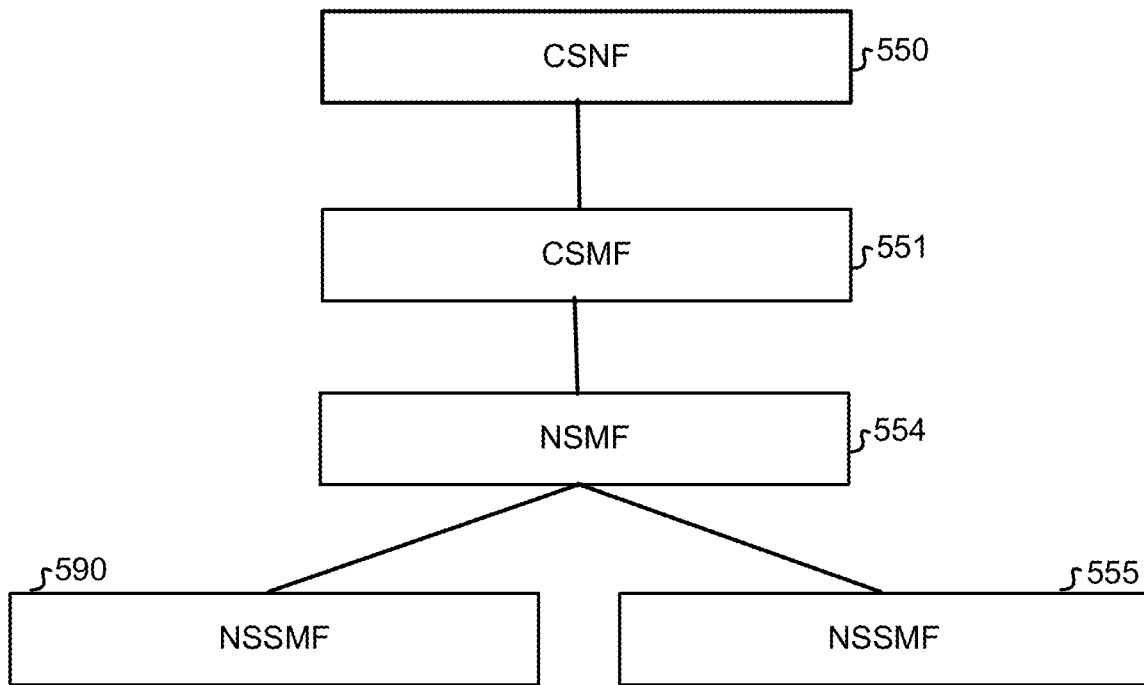
FIG. 14A is a block diagram illustrating the service and network requirements of an embodiment that implements one or more Network Slice Template (NST) and one or more Network Slice Subnet Template (NSST).
Figure 14B:
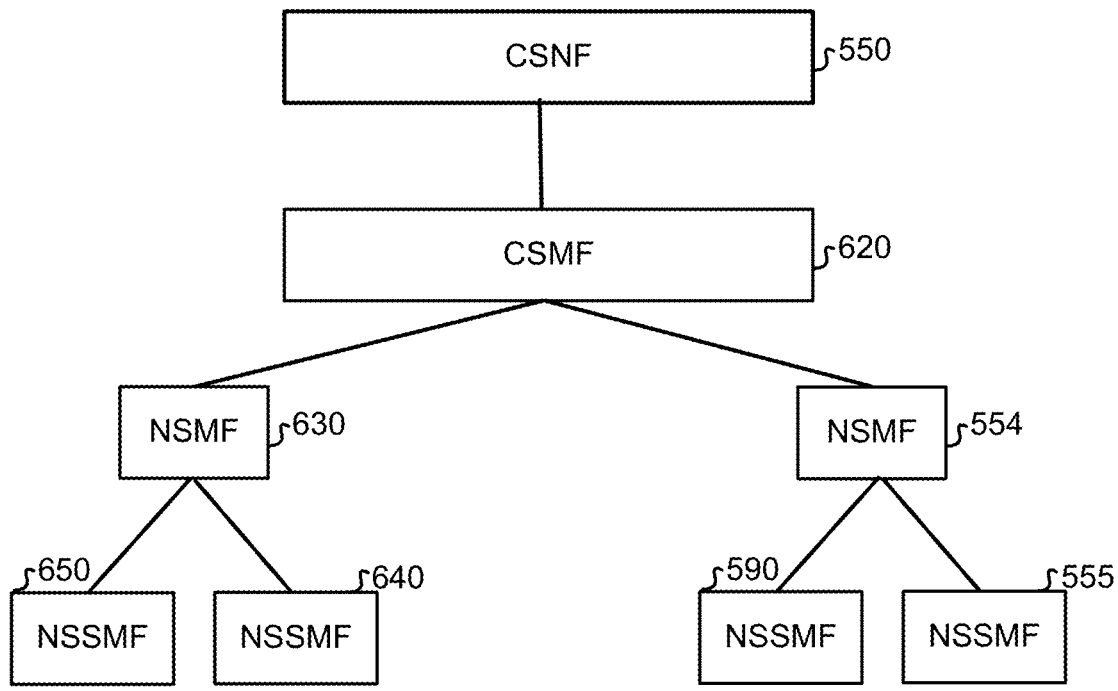
FIG. 14B is a block diagram illustrating the service and network requirements of an embodiment that implements a plurality of Network Slice Management Functions (NSMF), one or more Network Slice Template (NST) and one or more Network Slice Subnet Template (NSST).

FIGS. 14-A and 14-B are logical block diagrams of a system of network functions used to perform the method of network slice management, according to embodiments. FIG. 14A illustrates a Communication Service Network Function (CSNF) 550, a Communication Service Management Function (CSMF) 551, a Network Slice Management Function (NSMF) 554 and a pair of Network Sub-Slice Management Functions (NSSMFs) 555, 590. It should be appreciated that the term NSSMF can also stand for Network Slice Subnet Management Function, as the terms Slice subnet and sub-slice are used interchangeably herein. In some embodiments the CSMF 551 is configured to receive service requirements, receive capability exposure information, and transmit network slice requirements which satisfy the service requirements in accordance with the received capability exposure information. In some embodiments the NSMF 554 is configured to receive network slice requirements, receive sub-slice capability exposure information, and transmit network sub-slice requirements which satisfy the network slice requirements in accordance with the received sub-slice capability exposure information. In some embodiments the NSSMFs 555, 590 are configured to receive network sub-slice requirements, receive sub-slice capability exposure information, and aggregated sub-slice capability exposure information.

Accordingly FIG. 14-A illustrates a CSNF 550 which receives business/customer requirements and transmits service (instance) requirements to a CSMF 551 in accordance with the business/customer requirements. The CSMF 551 transmits network slice (instance) requirements to a NSMF 554. The NSMF 554 transmits subnet (slice instance) requirements to NSSMFs 555, 590. In this embodiment, the CSNF 550 supplies (e.g., transmits) service requirements on a per instance basis to the CSMF 551. The CSMF 551 supplies (e.g., transmits) the network requirements on a per slice instance basis to the NSMF 554. The NSMF 554 supplies (e.g., transmits) the subnet requirements to NSSMF 555 and the subnet requirements on a slice instance basis to a different NSSMF 590. In other words, the NSMF 554 can transmit subnet requirements on a network slice instance basis, which can differ between different NSSMFs. The NSSMFs 555, 590 expose different types of capabilities to the NSMF 554 depending on their configuration. The capabilities exposed can be classified into groups depending on the configuration of the NSSMFs 555, 590. It is noted that capabilities exposed/capability exposure in this specification refers to providing capability exposure information. The capability exposure information can be classified into four types, namely A, B, C and D, with type A including two sub-types. Accordingly NSSMFs 555, 590 can expose Type A1 (for which little or no information is exposed upwards) as it is request based, A2: identifies NSS type, B: Network Slice Subnet Template (NSST), C: NSST+capacity, D: all relevant information. It should be appreciated that each NSSMF 555, 590 can aggregate capabilities from a number of element managers (EMs) to provide the capabilities for the network slice instance under control of the NSSMF. For example resource capacity exposure information can include: A. Computing resources (including computation capability and Number of cores of CPU), B. Storage resources (e.g., hard disk capacity), C. Network bandwidth (e.g., maximum link data rate), D. RAN resources (e.g, bandwidth and coverage), E. interface information, and F. resources bearing traffic. It should be appreciated that this is a non-exhaustive list of capacity.

The NSMF 554 also supplies capabilities exposure to the CSMF 551. In some embodiments, the NSMF 554 can aggregate the exposure from NSSMFs 555, 590. The NSFM 554 can also provide capabilities classified into four groups: type A1: request based, A2: network slice type, B: Network Slice Template (NST), C: NST+capacity, D: all relevant information.

It should be appreciated that the CSNF 550 can provide service requirements to CSMF 551. These service requirements can include any or all of following (non-exhaustive list):

Service Type—KPI (per session)
Geographical area demand
Aggregate Service KPI (all devices, whole service)
Cost per the service instance
(Management) Data exposure
Management function exposure (capability given to $3^{rd}$ party)
Security
End user authentication method,
Physical or logical isolation requirements,
Congestion control mechanisms,
Resource specification,
Individual user charging and associated traffic monitoring method
Dynamic policy change possibilities
Network CP/UP exposure possibilities,
Traffic monitoring and controlling possibilities for customer,
Penalising methods for not meeting the SLA, etc.
Others As stated the CSMF 551 transmits network slice requirements to the NSMF 554. The network slice requirements are transmitted in accordance with the service requirements (received from the CSNF 550) and the capability exposure information received from the NSMF 554. The network slice requirements can also be classified in groups, depending on the capability exposure type provided by the NSMF 554. In a representative embodiment there are 4 types of such network slice requirements:

Type A1: parameters;
Type A2: network slice type plus parameters;
Type B: network slice template plus parameters;
Type C: network slice template plus parameters plus capacity; and
Type D: network slice template plus parameters plus capacity plus other relevant information.

Figure 23:
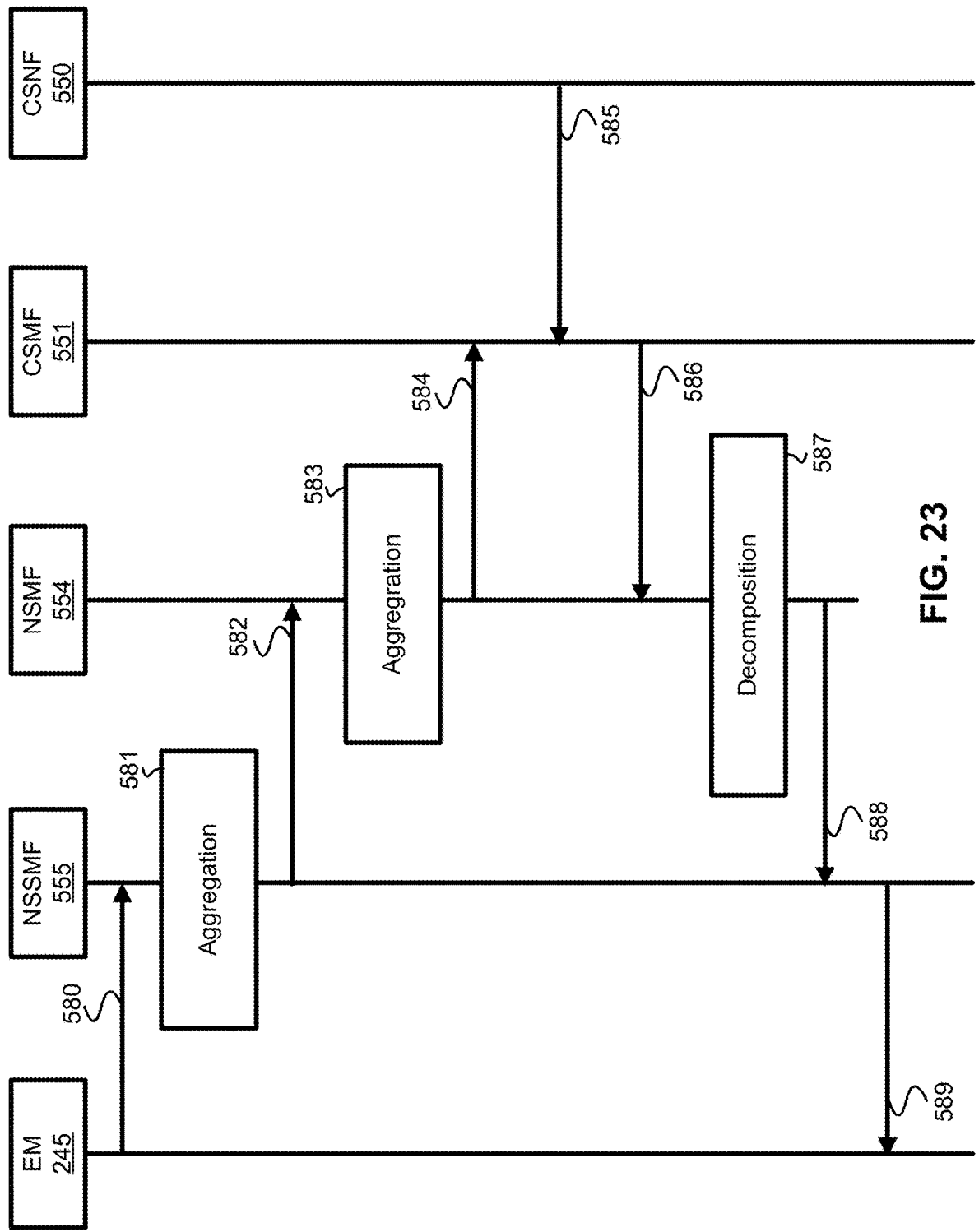
FIG. 23 is a call flow diagram according to an embodiment.

It should be pointed out that the parameters can include: Service-based NFs, Service-based NF chain, KPI (per session, probably passed from service requirements), Aggregate KPI, Translated information from service requirements including: Isolation, (Management) Data exposure, Security, and others As stated the NSMF 554 transmits network sub-slice requirements to the NSSMFs 555, 590. The network sub-slice requirements are transmitted in accordance with the network slice requirements (received from the CSMF 551) and the capability exposure information received from the NSSMFs 555, 590. The network sub-slice requirements can also be classified in groups, depending on the capability exposure type provided by the NSSMFs 555, 590. In a representative embodiment there are 4 types of such network sub-slice requirements:

Type A1: <NST+parameters+capacity> for the whole NSI
Type A2: NSS type+decomposition (NST+parameters+capacity)
Type B: NSST+decomposition (parameters+capacity)
Type C: NSST+parameters+capacity
Type D: NSST+parameters+capacity plus other relevant information In this context, decomposition includes a higher function (e.g., the NSMF 554) determining which lower function (e.g., which NSSMFs 555, 590) can provide resources. This can be determined, for example, geographically, or based on capacity or capability, etc., FIG. 23 discussed below illustrates an example call flow for a method of network slice management performed by the system of FIG. 14A, according to an embodiment. In FIG. 23 EM 245 provides the availability of the resources under its management to NSSMF 555 via signal 580. The NSSMF 555 aggregates, at step 581, the availability of EM resources and provides this capability exposure information, based on its capability exposure type, to the NSMF 554 via signal 582. The NSMF 554 aggregates, at step 583, the availability of NSSMF 555 resources, based on its capability exposure type, and provides this aggregated capability exposure information to the CSMF 551 via signal 584. The CSNF 550 provides service instance requirements to CSMF 551 via signal 585. CSMF 551 creates network slice instance requirements which satisfy the service instance requirements received from CSNF 550 and aggregated NSSMF resource availability received from NSMF 554. CSMF 551 then provides the network slice instance requirements to NSMF 554 via signal 586. NSMF 554 decomposes, at step 587, the network slice requirements and provides them to NSSMF 555 via signal 588. In some embodiments this procedure is used with network management functions such as slice provisioning and admission control. NSSMF 555 provides network slice instance requirements to EM 245 via signal 589.

The call flow illustrated by FIG. 23 is not limited to an entity, such as a NSSMF 555, NSMF 554, CSMF 551, or CSNF 550, sending requirements only after receiving management capability exposure information and resource capacity exposure information. Further, there are situations where any of the NSSMF 555, NSMF 554, CSMF 551, or CSNF 550 may not need to send management capability exposure information or resource capacity exposure information. Also, NSSMF 555, NSMF 554, CSMF 551, or CSNF 550 may send requirements before receiving management capability exposure information and resource capacity exposure information.

In some embodiments, the NST can include a combination of parameters selected from (a non-exhaustive list):
Network slice type
Supported Network Functions, NSS type
NF chains, NSS dependency
Location of NFs
Supported QoS level per session
Security
Isolation
Data exposure
Service duration
Supported aggregate KPI
NSST/NFD It should be appreciated that the NSST can include similar information on a per subnet (i.e., sub-slice) basis (e.g., including sub-slice type rather than slice type). In some embodiments, the NSST can include a combination of parameters selected from (a non-exhaustive list):
Network slice type
Network slice subnet type
Supported Network Functions, NSS type
NF chains, NSS dependency
Location of NFs
Supported QoS level per session
Security
Isolation
Data exposure
Service duration
Supported aggregate KPI
NSST/NFD In some embodiments the capability exposure information includes management capability exposure information and resource capacity exposure information. It should be appreciated that management capability exposure information can include a combination of parameters selected from NF chains, NSS dependency, location of NFs, and data exposure.

FIG. 14-B schematically illustrates a method of network slice management according to an embodiment with a plurality of NSMFs. FIG. 14-B illustrates a CSNF 550, a CSMF 620, a pair of NSMFs 554, 630 and four NSSMFs 555, 590, 640, 650. In some embodiments the CSMF 620 is configured to receive service requirements from CSNF 550 and to receive capability exposure information from both NSMF 554, 630. CSMF 620 transmits network slice requirements to NSMF 554 in accordance with the service requirements received from CSNF 550 and capability exposure information received from NSMF 554. CSMF 620 transmits network slice requirements to NSMF 630 in accordance with the service requirements received from CSNF 550 and capability exposure information received from and NSMF 630. Those skilled in the art will appreciate that the network slice requirements transmitted to NSMF 554 may or may not be the same network slice requirements transmitted to NSMF 630 because NSMFs 554, 630 expose different levels of capabilities to the CSMF 620 depending on their configuration. NSMF 554 transmits network slice requirements to NSSMF 555 in accordance with the service requirements received from CSMF 620 and capability exposure received from NSSMF 555. NSMF 554 transmits network slice requirements to NSSMF 590 in accordance with the service requirements received from CSMF 620 and capability exposure information received from NSSMF 590. NSMF 630 transmits network slice requirements to NSSMF 640 in accordance with the service requirements received from CSMF 620 and capability exposure information received from NSSMF 640. NSMF 630 transmits network slice requirements to NSSMF 650 in accordance with the service requirements received from CSMF 620 and capability exposure information received from NSSMF 650. Those skilled in the art will appreciate that the network slice requirements transmitted to NSSMF 555 may or may not be the same network slice requirements transmitted to NSSMF 590 and that the network slice requirements transmitted to NSSMF 640 may or may not be the same network slice requirements transmitted to NSSMF 650 because NSSMFs 555, 590, 640, 650 expose different levels of capabilities to the NSMFs 554, 630 depending on their configuration.

While FIG. 14-B illustrates an embodiment including two NSMFs and four NSSMFs. Those skilled in the art will appreciate that the method of slice management is not limited to two NSMFs nor four NSSMFs and may include embodiments with a plurality of NSMFs and a plurality of NSSMFs.

Figure 15:
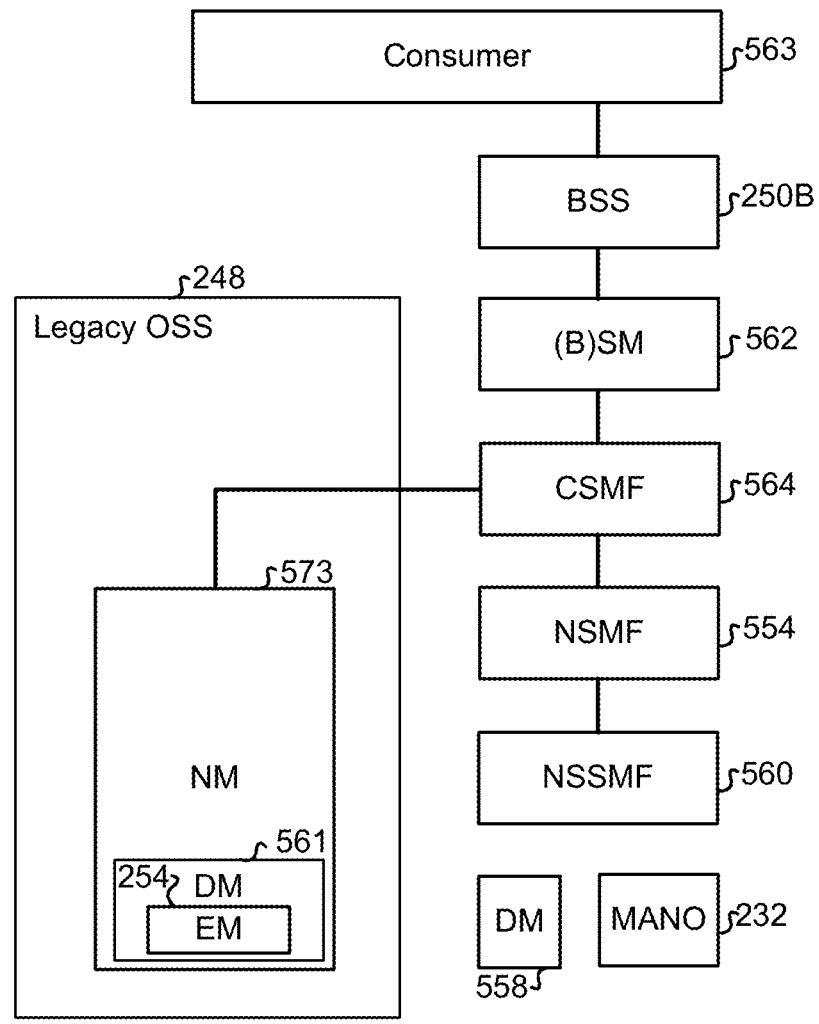
FIG. 15 is a block diagram that illustrates the Business Support System (BSS) and the Operating Support System (OSS) functions needed by service providers to provide network slices to their customers.

FIG. 15 illustrates an embodiment of the Business Support System (BSS) and Operations Support System (OSS) functions required to be provided by a service provider to meet the QoS of the consumer's SLA. The BSS of this embodiment includes BSS 250B which provides customer management (in the form of CEM, CRM, and billing), order management, product management, and revenue management. The Consumer 563 communicates with the BSS 250B. The OSS of this embodiment includes the Service Management Level, the Network Management Level, and the EM level. The Service Management Level includes the Business Service Management (BSM) 562 which provides service negotiation support functions (SVNF), service definition, delivery, charging, inventory, a service portal, activation and provisioning. The BSM 562 also prepares the service requirements for service fulfillment. In some embodiments the CSNF 550 of FIG. 14-A can be implemented by the BSM 562. In some embodiments the BSM 562 carries out the functions of CSNF 550 of FIG. 14-A, effectively replacing the CSNF 550. Accordingly the terms BSM and CSNF are used interchangeably herein. Further the BSM is sometimes referred to as simply the service manager (SM), hence the label (B)SM is used to indicate the "B" is sometimes dropped. In some embodiments the BSS 250B carries out the functions of, and replaces, CSNF 550 of FIG. 14-A. The CSMF 564 is also a component of the Service Management Level and its function is to communicate service requirements for network slice requirement mapping. The Network Management Level includes the (B)SM 562, NM 573 (which is a component of Legacy OSS 248), NSMF 554, and NSSMF 560. These components configure, control, supervise and distribute network resources. The EM level includes the DM 561 (which instantiates the EM 254) and is a component of Legacy OSS 248. The EM level is also comprised of a DM 558 and MANO 232. What is shown in FIG. 15 is only for communication services. For NSII/NSSI as a service, SM directly contacts NSMF/NSSMF (both use CMMF). The NSMF/NSSMF may be managed by consumer appropriate functions.

Figure 16A:
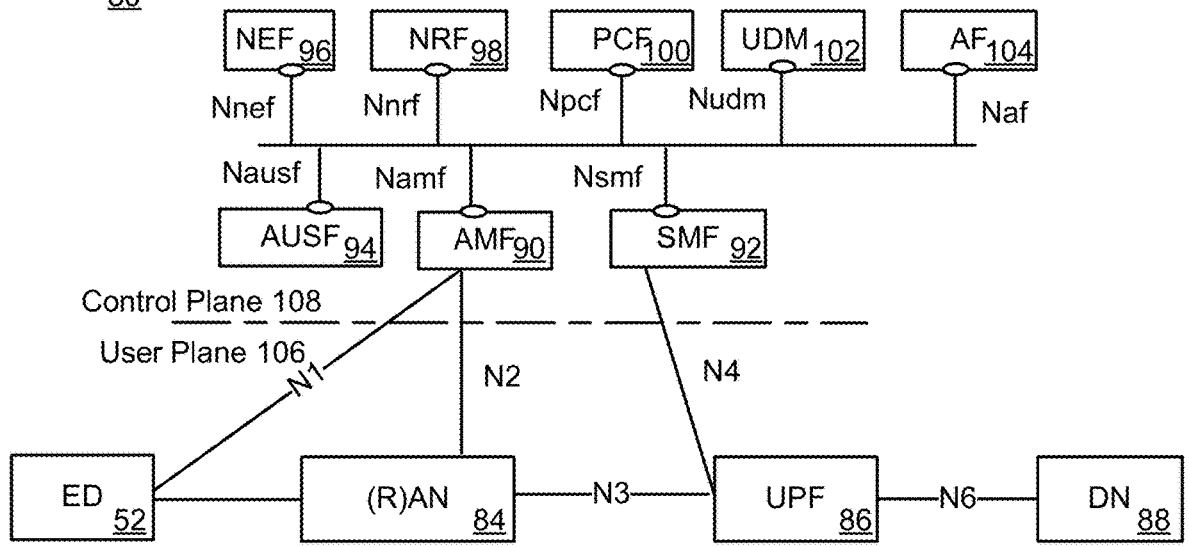
FIG. 16A is a block diagram illustrating a service-based view of a system architecture of a 5G Core Network.
Figure 16B:
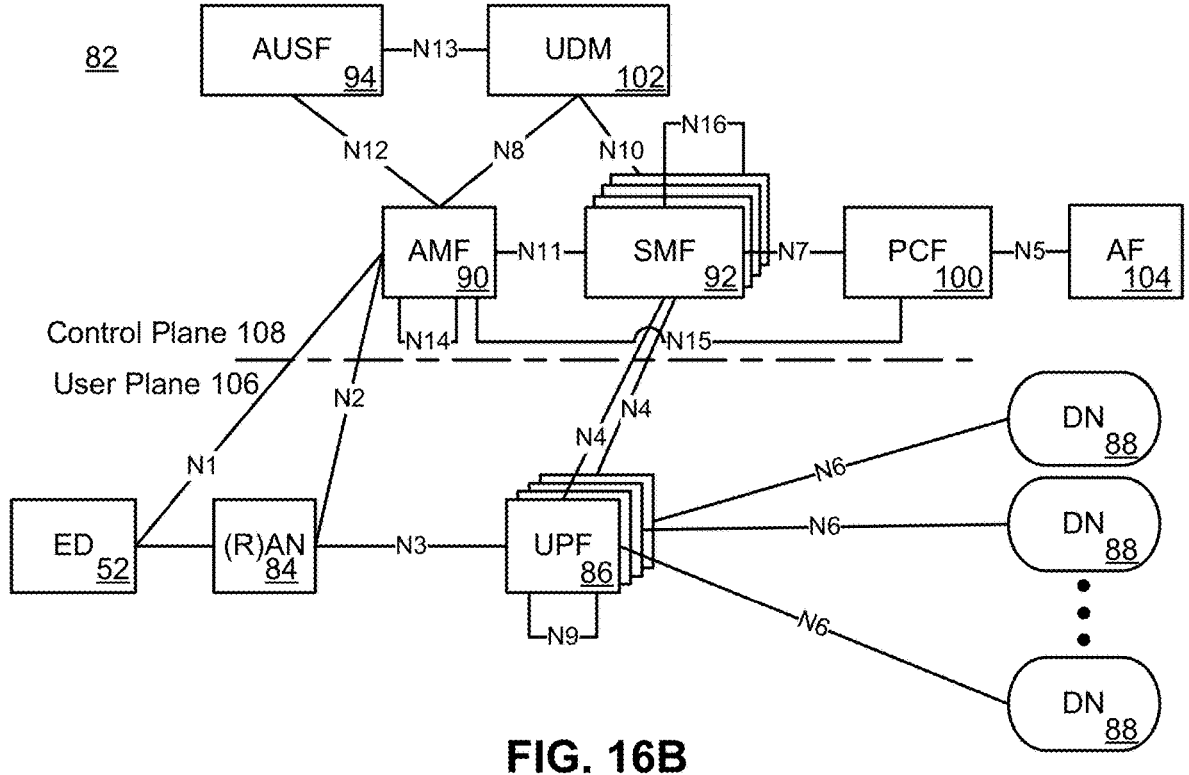
FIG. 16B is a block diagram illustrating the system architecture of a 5G Core Network as shown in FIG. 16A from the perspective of reference point connectivity.

FIG. 16-A illustrates a service-base architecture 80 for a 5G or Next Generation Core Network (5GCN/NGCN/NCN). This illustration depicts logical connections between nodes and functions, and its illustrated connections should not be interpreted as direct physical connection. ED 52 forms a radio access network connection with a (Radio) Access Network node (R)AN 84, which is connected to a User Plane (UP) Function (UPF) 86 such as a UP Gateway over a network interface such as an N3 interface. UPF 86 connects to a Data Network (DN) 88 over a network interface such as an N6 interface. DN 88 may be a data network used to provide an operator service, or it may be outside the scope of the standardization of the Third Generation Partnership Project (3GPP), such as the Internet, a network used to provide third party service, and in some embodiments DN 88 may represent an Edge Computing network or resource, such as a Mobile Edge Computing (MEC) network. ED 52 also connects to the Access and Mobility Management Function (AMF) 90. The AMF 90 is responsible for authentication and authorization of access requests, as well as Mobility management functions. The AMF 90 may perform other roles and functions as defined by the 3GPP Technical Specification (TS) 23.501. In a service based view, AMF 90 can communicate with other functions through a service based interface denoted as Namf. The Session Management Function (SMF) 92 is a network function that is responsible for the allocation and management of IP addresses that are assigned to a UE as well as the selection of a UPF 86 (or a particular instance of a UPF 86) for traffic associated with a particular session of ED 52. The SMF 92 can communicate with other functions, in a service based view, through a service based interface denoted as Nsmf. The Authentication Server Function (AUSF) 94, provides authentication services to other network functions over a service based Nausf interface. A Network Exposure Function (NEF) 96 can be deployed in the network to allow servers, functions and other entities such as those outside a trusted domain to have exposure to services and capabilities within the network. In one such example, an NEF 96 can act much like a proxy between an application server outside the illustrated network and network functions such as the Policy Control Function (PCF) 100, the SMF 92 and the AMF 90, so that the external application server can provide information that may be of used in the setup of the parameters associated with a data session. The NEF 96 can communicate with other network functions through a service based Nnef network interface. The NEF 96 may also have an interface to non-3GPP functions. A Network Repository Function (NRF) 98, provides network service discovery functionality. The NRF 98 may be specific to the Public Land Mobility Network (PLMN) or network operator, with which it is associated. The service discovery functionality can allow network functions and UEs connected to the network to determine where and how to access existing network functions, and may present the service based interface Nnrf. PCF 100 communicates with other network functions over a service based Npcf interface, and can be used to provide policy and rules to other network functions, including those within the control plane. Enforcement and application of the policies and rules is not necessarily the responsibility of the PCF 100, and is instead typically the responsibility of the functions to which the PCF 100 transmits the policy. In one such example the PCF 100 may transmit policy associated with session management to the SMF 92. This may be used to allow for a unified policy framework with which network behavior can be governed. A Unified Data Management Function (UDM) 102 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 102 may be implemented as a UDM Front End (UDM-FE) and a User Data Repository (UDR). The PCF 100 may be associated with the UDM 102 because it may be involved with requesting and providing subscription policy information to the UDR, but it should be understood that typically the PCF 100 and the UDM 102 are independent functions. The PCF may have a direct interface to the UDR. The UDM-FE receives requests for content stored in the UDR, or requests for storage of content in the UDR, and is typically responsible for functionality such as the processing of credentials, location management and subscription management. The UDR-FE may also support any or all of Authentication Credential Processing, User Identification handling, Access Authorization, Registration/Mobility management, subscription management, and Short Message Service (SMS) management. The UDR is typically responsible for storing data provided by the UDM-FE. The stored data is typically associated with policy profile information (which may be provided by PCF 100) that governs the access rights to the stored data. In some embodiments, the UDR may store policy data, as well as user subscription data which may include any or all of subscription identifiers, security credentials, access and mobility related subscription data and session related data. Application Function (AF) 104 represents the non-data plane (also referred to as the non-user plane) functionality of an application deployed within a network operator domain and within a 3GPP compliant network. The AF 104 interacts with other core network functions through a service based Naf interface, and may access network capability exposure information, as well as provide application information for use in decisions such as traffic routing. The AF 104 can also interact with functions such as the PCF 100 to provide application specific input into policy and policy enforcement decisions. It should be understood that in many situations the AF 104 does not provide network services to other NFs, and instead is often viewed as a consumer or user of services provided by other NFs. An application outside the 3GPP network, can perform many of the same functions as AF 104 through the use of NEF 96.

ED 52 communicates with network functions that are in the Core Network User Plane (CN UP) 106, and the Core Network Control Plane (CN CP) 108. The UPF 86 is a part of the CN UP 106 (DN 88 being outside the 5GCN). (R)AN 84 may be considered as a part of a User Plane, but because it is not strictly a part of the CN, it is not considered to be a part of the CN UP 106. AMF 90, SMF 92, AUSF 94, NEF 96, NRF 98, PCF 100, and UDM 102 are functions that reside within the CN CP 108, and are often referred to as Control Plane Functions. AF 104 may communicate with other functions within CN CP 108 (either directly or indirectly through the NEF 96), but is typically not considered to be a part of the CN CP 108.

Those skilled in the art will appreciate that there may be a plurality of UPFs connected in series between the (R)AN 84 and the DN 88, and as will be discussed with respect to FIG. 16-B, multiple data sessions to different DNs can be accommodated through the use of multiple UPFs in parallel.

FIG. 16-B illustrates a reference point representation of a 5G Core Network architecture 82. For the sake of clarity, some of the network functions illustrated in FIG. 16-A are omitted from this figure, but it should be understood that the omitted functions (and those not illustrated in either FIG. 16-A or FIG. 16-B) can interact with the illustrated functions.

ED 52 connects to both (R)AN 84 (in the user plane 106) and AMF 90 (in the control plane 108). The ED-to-AMF connection is an N1 connection. (R)AN 84 also connects to the AMF 90, and does so over an N2 connection. The (R)AN 84 connects to a UPF function 86 over an N3 connection. The UPF 86 is associated with a PDU session, and connects to the SMF 92 over an N4 interface to receive session control information. If ED 52 has multiple PDU sessions active, they can be supported by multiple different UPFs 86, each of which is connected to an SMF 92 over an N4 interface. It should be understood that from the perspective of reference point representation, multiple instances of either an SMF 92 or an UPF 86 are considered as distinct entities. Each UPF 86 connects to a different DN 88 outside the 5GCN over an N6 interface. SMF 92 connects to the PCF 100 over an N7 interface, while the PCF 100 connects to an AF 104 over an N5 interface. The AMF 90 connects to the UDM 102 over an N8 interface. If two UPFs in UP 106 connect to each other, they can do so over an N9 interface. The UDM 102 can connect to an SMF 92 over an N10 interface. The AMF 90 and SMF 92 connect to each other over an N11 interface. The N12 interface connects the AUSF 94 to the AMF 90. The AUSF 94 can connect to the UDM 102 over the N13 interface. In networks in which there is a plurality of AMFs, they can connect to each other over an N14 interface. The PCF 100 can connect to an AMF 90 over the N15 interface. If there is a plurality of SMFs in the network, they can communicate with each other over an N16 interface.

It should also be understood that any or all of the functions and nodes, discussed above with respect to the architectures 80 and 82 of the 5G Core Network, may be virtualized within a network, and the network itself may be provided as a network slice of a larger resource pool, as will be discussed below.

Figure 17:
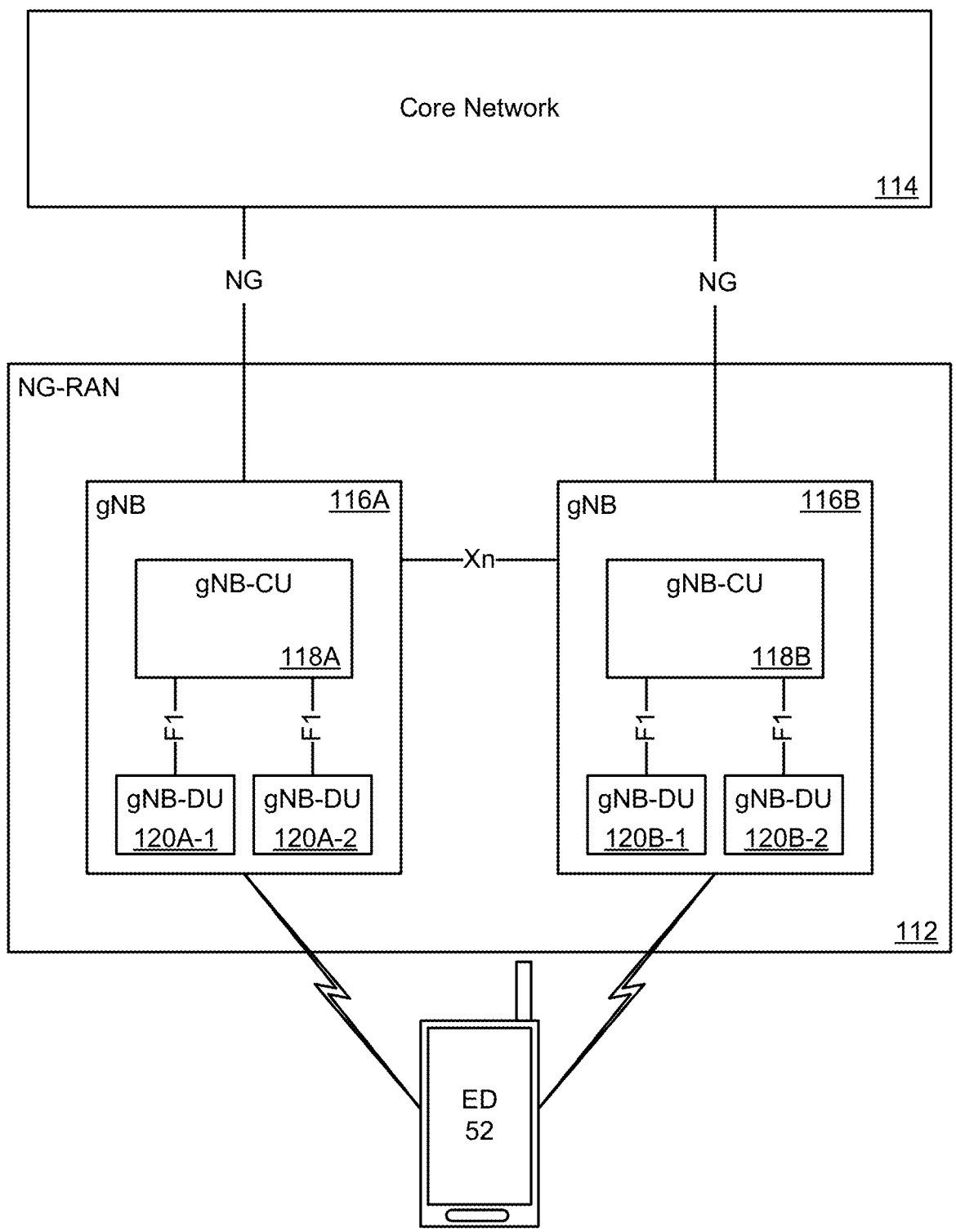
FIG. 17 is a block diagram illustrating an architecture of a 5G Radio Access Network architecture.

FIG. 17 illustrates a proposed architecture 110 for the implementation of a Next Generation Radio Access Network (NG-RAN) 112, also referred to as a 5G RAN. NG-RAN 112 is the radio access network that connects an ED 52 to a core network 114. In this architecture, ED 52 is a UE. Those skilled in the art will appreciate that core network 114 may be the 5GCN (as illustrated in FIG. 16-A and FIG. 16-B). In other embodiments, the core network 114 may be a 4g Evolved Packet Core (EPC) network. Nodes with NG-RAN 112 connect to the 5G Core Network 114 over an NG interface. This NG interface can comprise both the N2 interface to a control plane and an N3 interface to a user plane as illustrated in FIG. 16-A and FIG. 16-B. The N3 interface can provide a connection to a CN UPF. NG-RAN 112 includes a plurality of radio access nodes which can be referred to as a next generation NodeB (gNodeB, or gNB). In the NG-RAN 112, gNB 116A and gNB 116B are able to communicate with each other over an Xn interface. Within a single gNB 116A, the functionality of the gNB may be decomposed into a Centralized Unit (gNB-CU) 118A and a set of distributed units (gNB-DU 120A-1 and gNB-DU 120A-2, collectively referred to as 120A). gNB-CU 118A is connected to a gNB-DU 120A over an F1 interface. Similarly gNB 116B has a gNB-CU 118B connecting to a set of distributed units gNB-DU 120B-1 and gNB-DU 120B-2. Each gNB-DU may be responsible for one or more cells providing radio coverage within the PLMN.

The division of responsibilities between the gNB-CU and the gNB-DU has not been fully defined at this time. Different functions, such as the radio resource management functionality may be placed in one of the CU and the DU. As with all functional placements, there may be advantages and disadvantages to placement of a particular network function in one or the other location. It should also be understood that any or all of the functions discussed above with respect to the NG-RAN 112 may be virtualized within a network, and the network itself may be provided as a network slice of a larger resource pool, as will be discussed below.

Figure 18A:
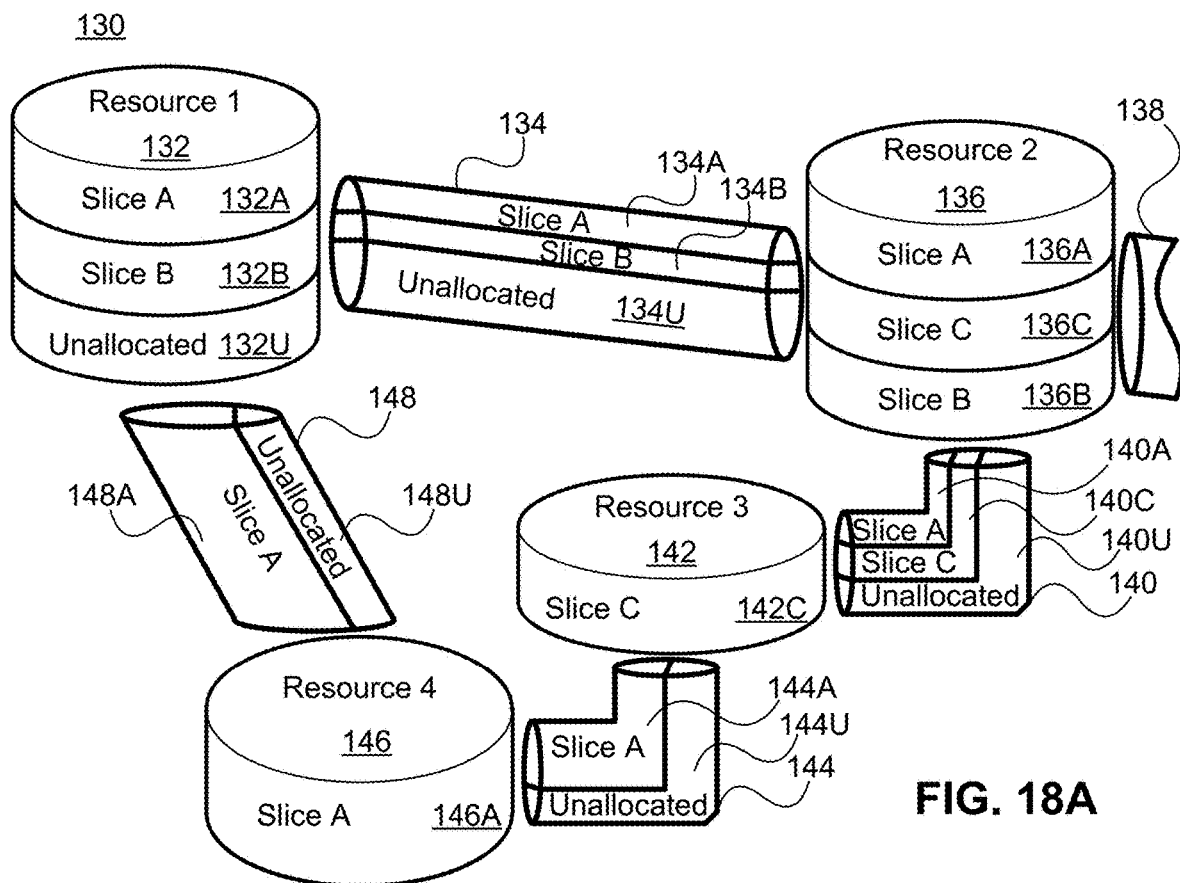
FIG. 18A is a block diagram schematically illustrating an architecture in which network slicing can be implemented.
Figure 18B:
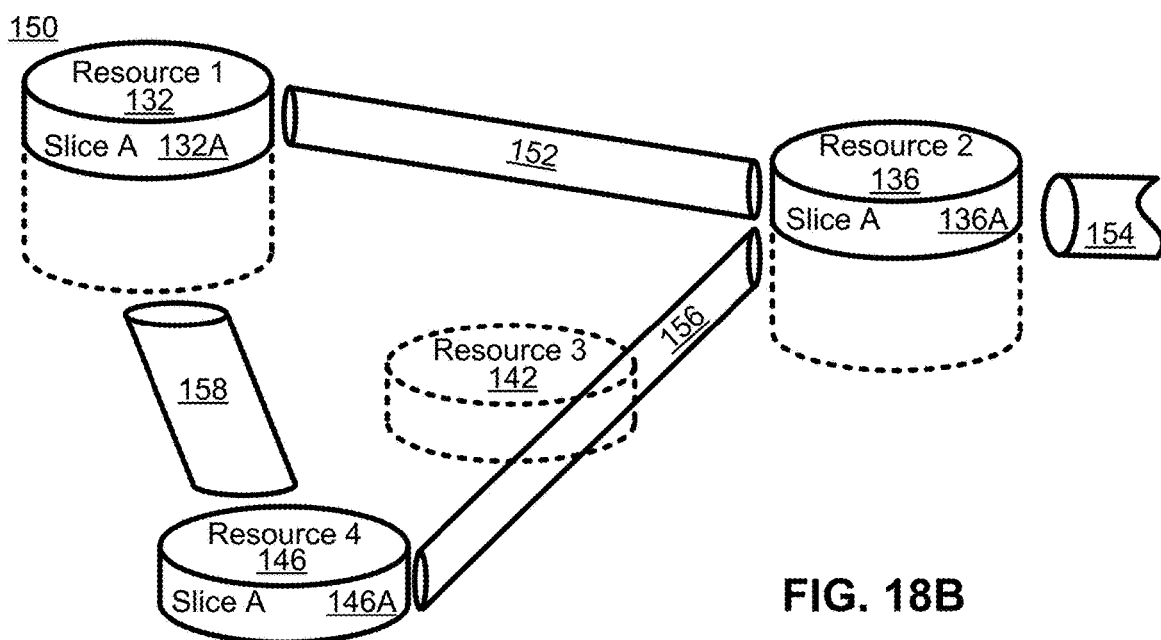
FIG. 18B is a block diagram illustrating the architecture discussed in FIG. 18-A from the perspective of a single slice.

FIG. 18-A illustrates an architecture 130 that connects a plurality of computing resources (e.g., connectivity, compute, and storage resources), and supports network slicing. In the following, resources are connected to other discrete resources through Connectivity Resources 134, 138, 140, 144 and 148. It will be understood that as network functions are instantiated within computing resources (e.g., within network elements including connectivity, compute and storage resources), they may be connected to each other by virtual connections that in some embodiments do not rely upon the physical connectivity resources illustrated, but instead may be connected to each other by virtual connections, which will also be considered as connectivity resources. Resource 1 132 is connected to Resource 2 136 by Connectivity Resource 134. Resource 2 136 is connected to unillustrated resources through Connectivity Resource 138, and is also connected to Resource 3 142 by Connectivity Resource 140. Resource 4 146 is connected to Resource 3 142 through Connectivity Resource 144, and to Resource 1 132 by Connectivity Resource 148. Resource 1 132, Resource 2 136, Resource 3 142 and Resource 4 146 should be understood as representing both compute and storage resources, although specialized functions may also be included. In some embodiments a specialized network function may be represented by any or all of Resource 1 132, Resource 2 136, Resource 3 142 and Resource 4 146, in which case, it may be the capability or capacity of the network function that is being sliced. Connectivity Resources 134, 138, 140, 144 and 148 may be considered, for the following discussions, as logical links between two points (e.g. between two data centers) and may be based on set of physical connections.

Resource 1 132 is partitioned to allocate resources to Slice A 132A, and Slice B 132B. A portion 132U of the resources available to Resource 1 132 remains unallocated. Those skilled in the art will appreciate that upon allocation of the network resources to different slices, the allocated resources are isolated from each other. This isolation, both in the compute and storage resources, ensures that processes in one slice do not interact or interfere with the processes and functions of the other slices. This isolation can be extended to the connectivity resources as well. Connectivity Resource 134 is partitioned to provide connectivity to Slice A 134A and Slice B 134B, and also retains some unallocated bandwidth 134U. It should be understood that in any resource that either has unallocated resources or that has been partitioned to support a plurality of resources, the amount of the resource (e.g. the allocated bandwidth, memory, or number of processor cycles) can be varied or adjusted to allow changes to the capacity of each slice. In some embodiments, slices are able to support "breathing", which allows the resources allocated to the slice to increase and decrease along with any of the available resources, the required resources, an anticipated resource need, or other such factors, alone or in combination with each other. In some embodiments the allocation of resources may be in the form of soft slices in which a fixed allocation is not committed and instead the amount of the resource provided may be flexible. In some embodiments, a soft allocation may allocate a percentage of the resource to be provided over a given time window, for example 50% of the bandwidth of a connection over a time window. This may be accompanied by a minimum guaranteed allocation. Receiving a guarantee of 50% of the capacity of a connectivity resource at all times may provide very different service characteristics than receiving 50% of the capacity of the connectivity resource over a ten second window.

Resource 2 136 is partitioned to support allocations of the available compute and storage resources to Slice A 136A, Slice C 136C and Slice B 136B. Because there is no allocation of resources in Connectivity Resource 134 to Slice C, Resource 2 136 may, in some embodiments, not provide a network interface to Slice C 136C to interact with Connectivity Resource 134. Resource 2 136 can provide an interface to different slices to Connectivity Resource 138 in accordance with the slices supported by Connectivity Resource 138. Connectivity Resource 140 is allocated to Slice A 140A and Slice C 140C with some unallocated capacity 140U. Connectivity Resource 140 connects Resource 2 136 with Resource 3 142.

Resource 3 142 provides compute and storage resources that are allocated exclusively to Slice C 142C, and is also connected to Connectivity Resource 144 which in addition to the unallocated portion 144U includes an allocation of Connectivity Resource 144A to slice A. It should be noted that from the perspective of functions or processes within Slice A, Resource 3 142 may not be visible. Connectivity Resource 144 provides a connection between Resource 3 142 and Resource 4 146, whose resources are allocated entirely to Slice A 146A. Resource 4 146 is connected to Resource 1 132 by Connectivity Resource 148, which has a portion of the connection allocated to Slice A 148A, while the balance of the resources 148U are unallocated.

FIG. 18-B illustrates the view of the architecture 136 of FIG. 18-A as would be seen from the perspective of Slice A. This may be understood as a view of the resources allocated to Slice A 150 across the illustrated network segment. From within Slice A 150, only the portions of the resources that have been allocated to Slice A 150 are visible. Thus, instead of being able to see the full capacity and capability of Resource 1 132, the capabilities and capacity of the portion allocated to Slice A 132A is available. Similarly, instead of being able to see the capacity and capabilities of Resource 2 136, only the capabilities and capacity of the portion allocated to Slice A 136A are available. Because nothing from Resource 3 142 had been allocated to Slice A 150, Resource 3 142 is not present within the topology of Slice A 150. All of the capacity and capability of Resource 4 146 was allocated to Slice A 146, and as such is present within Slice A 150. Slice A 132A of Resource 1 132 is connected to Slice A 136A of Resource 2 136 by logical link 152. Logical Link 152 may correspond to the portion of Connectivity Resource 134 allocated to Slice A 134A. Slice A 136A is connected to logical link 154 (representative of the portion of Connectivity Resource 138 allocated to Slice A 150), and is connected to Slice A 146A by logical link 156. Logical link 156 is representative of the portions of Connectivity Resource 140 and Connectivity Resource 144 that have been allocated to Slice A (portions 140A and 144A respectively). It should be understood that due to the absence of Resource 3 142 from Slice A 150, any traffic transmitted by Slice A 136A onto Connectivity Resource 140A will be delivered to Resource 4 146, and similarly any traffic transmitted from Slice 146A into Connectivity Resource 144A will be delivered to Slice A 136A. As such, within Slice A 150, Connectivity Resources 140A and 144A can be modelled as a single logical link 156. Logical link 158 is representative of the portion of Connectivity Resource 148 allocated to slice A 148A.

It should be understood that within the storage and compute resources illustrated in FIGS. 18-A and 18-B, network functions can be instantiated using any of a number of known techniques, including network function virtualization (NFV), to create Virtual Network Functions (VNFs). While conventional telecommunications networks, including so-called Third Generation and Fourth Generation (3G/4G) networks, can be implemented using virtualized functions in their core networks, next generation networks, including so-called Fifth Generation (5G) networks, are expected to use NFV and other related technologies as fundamental building blocks in the design of a new Core Network (CN) and Radio Access Network (RAN). By using NFV, and technologies such as Software Defined Networking (SDN), functions in a CN can be instantiated at a location in the network that is determined based on the needs of the network. It should be understood that if a network slice is created, the allocation of resources at different data centers allows for the instantiation of a function at or near a particular geographic location, even within the slice where resources have been abstracted. This allows virtualized functions to be "close" in a physical sense to the location at which they are used. This may be useful, and may be combined with a sense of topological closeness to select a logical location at which to instantiate a function so that it is geographically or topologically close to a selected physical or network location.

Figure 19:
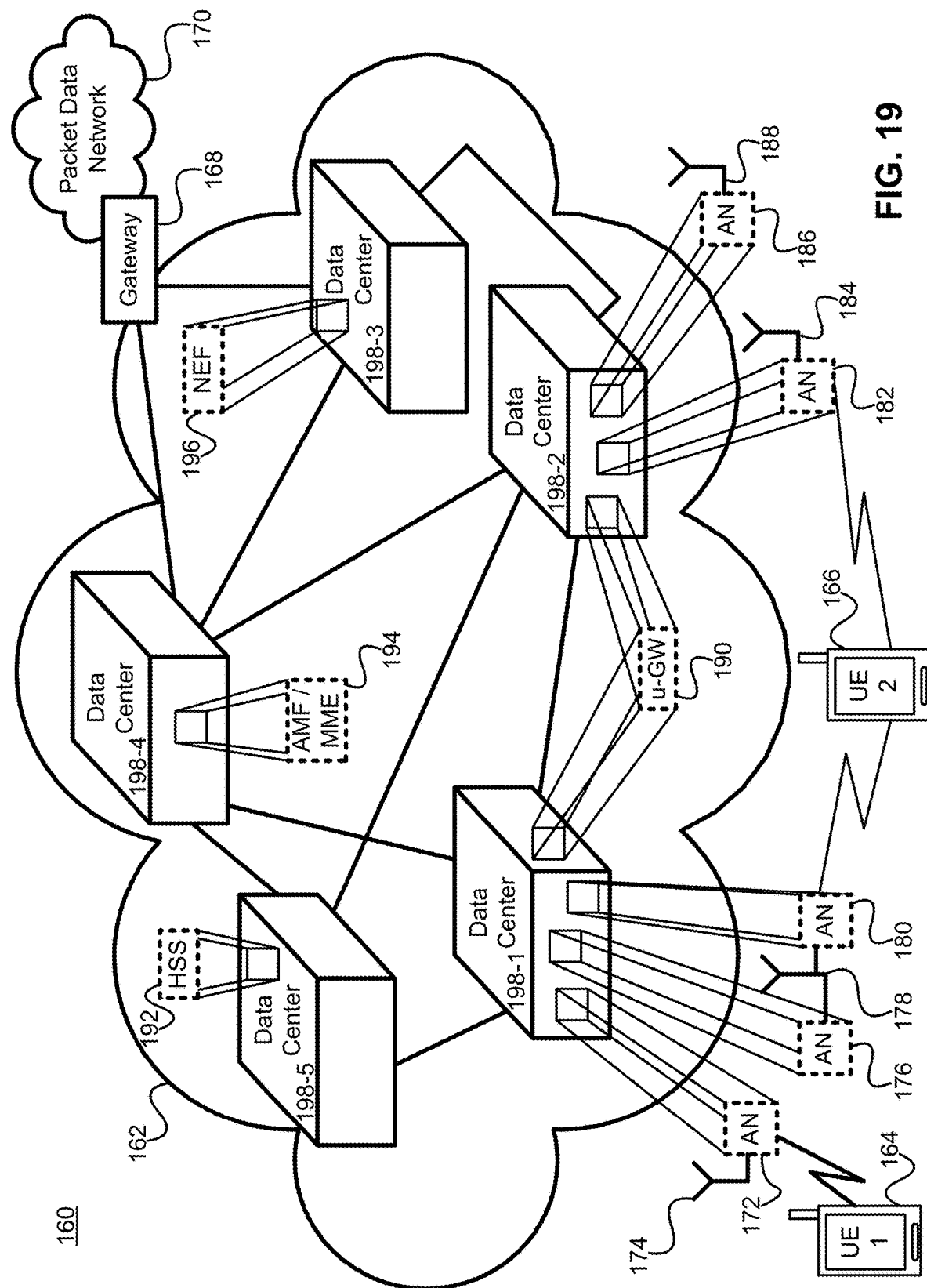
FIG. 19 is a diagram illustrating a cloud-based implementation of a Core Network and Radio Access Network using virtualized functions.

FIG. 19 illustrates a system 160 in which a core/RAN network 162 provides radio access and core network services to two UEs, UE1 164 and UE2 166, which can take the form of the ED 52 of FIG. 1. In this figure, network functions are instantiated upon the underlying computing and storage resources of a data center. The functions are shown as being exploded out of the pool of computing and storage resources upon which they are instantiated. This is done to indicate that the functions act as independent entities and from a logical perspective they are indistinguishable from a physical node carrying out the same function. It should also be understood that in a sliced network where data centers provide the underlying computing and storage resources upon which the network slices are created, it is possible for a single network to have network slices that support different versions of networks, so for example, in addition to having a virtualized network to support 5G traffic, a separate network slice can be created to support 4G networks. Traffic from UE1 164 and UE2 166 can be routed through network functions, to a gateway 168 that provides access to a packet data network 170 such as the Internet. Radio access services are typically provided by a RAN, which in this illustration is provided as a Cloud-RAN (C-RAN). Where a conventional RAN architecture was designed to include discrete elements, such as eNodeBs, that were connected to the Core Network through a backhaul network, a C-RAN takes advantage of function virtualization to virtualize the Access Nodes of the network. Much as a physical Access Node, such as an eNodeB, was connected to an antenna by a front haul link, in the illustrated embodiment of a C-RAN Access Node, such as a gNodeB, are connected to antenna (or to a remote radio head (RRH)) through a front haul connection, but are functions that are instantiated upon compute resources in core/RAN network 162. If a gNodeB is divided into a Central Unit and a plurality of Distributed Units, the virtualized Distributed Units may in some embodiments be instantiated at or near the location of the antenna or RRH, while a Centralized Unit may be instantiated at a data center to connect and serve a plurality of geographically dispersed Distributed Units. For example, UE1 164 is connected to the network through AN 172, which can provide radio access services through antenna 174. AN 172 is instantiated upon the computing and storage resources provided by a data center, in this case data center 198-1. Similarly, AN 176 and AN 180, which are connected to the same set of antennae 178, are also instantiated upon the computing and storage resources of data center 198-1. AN 180 provides radio access services to UE 2 166, which also makes use of the access services provided by AN 182. AN 182 is connected to antenna 184, and is instantiated upon the resources of data center 198-2. AN 186 is connected to antenna 188, and is also instantiated upon the computing and storage resources of data center 198-2. It should be understood that the fronthaul connections linking the virtualized access nodes to the antennas or RRHs, may be direct connections, or they may form a fronthaul network. The integration of a CRAN into a core network may obviate or reduce the concerns associated with backhaul connections as the AN functions may be co-located with CN functions. As such, Data Center 198-1 also serves as a location at which a user-specific gateway function (u-GW) 190 is instantiated. This function is also instantiated in data center 198-2. Having a function instantiated at more than one data center may be part of a function migration process in which the function is moved through the network, or one of the instantiations may be an intentionally redundant instantiation. Both functions can be instantiated and configured, with only one of them active at a time, or they may both be active, but only one of them may be transmitting data to the UE. In other embodiments, such as those focused on Ultra-Reliable connections, such as Ultra-Reliable Low Latency Communications (URLLC), both functions may be active and transmitting data to (or receiving data from) an ED such as UE2 166. Network functions such as a Home Subscriber Server (HSS) 192, an Access and Mobility Management Function (AMF) 194 or its predecessor Mobility Management Entity (MME), and a Network Exposure Function (NEF) 196 are shown as being instantiated on the resources of Data Center 198-5, 198-4 and 198-3 respectively.

The virtualization of the network functions allows a function to be located in the network at a location topologically close to the demand for the service provided by the function. Thus, AN 172, which is associated with antenna 174, can be instantiated upon computing and storage resources at the data center closest to the antenna 174, in this case data center 198-1. Functions such as an NEF 196, which may not need to be close to ANs, may be instantiated further away (in either or both of a topological or physical sense). Thus, NEF 196 is instantiated upon computing and storage resources at data center 198-3, and the HSS 192 and AMF 194 are instantiated upon computing and storage resources at data centers 198-5 and 198-4 respectively, which are topologically closer to the radio edge of the network 162. In some network implementations, data centers can be arranged hierarchically and different functions can be placed at different levels in the hierarchy.

Figure 20:
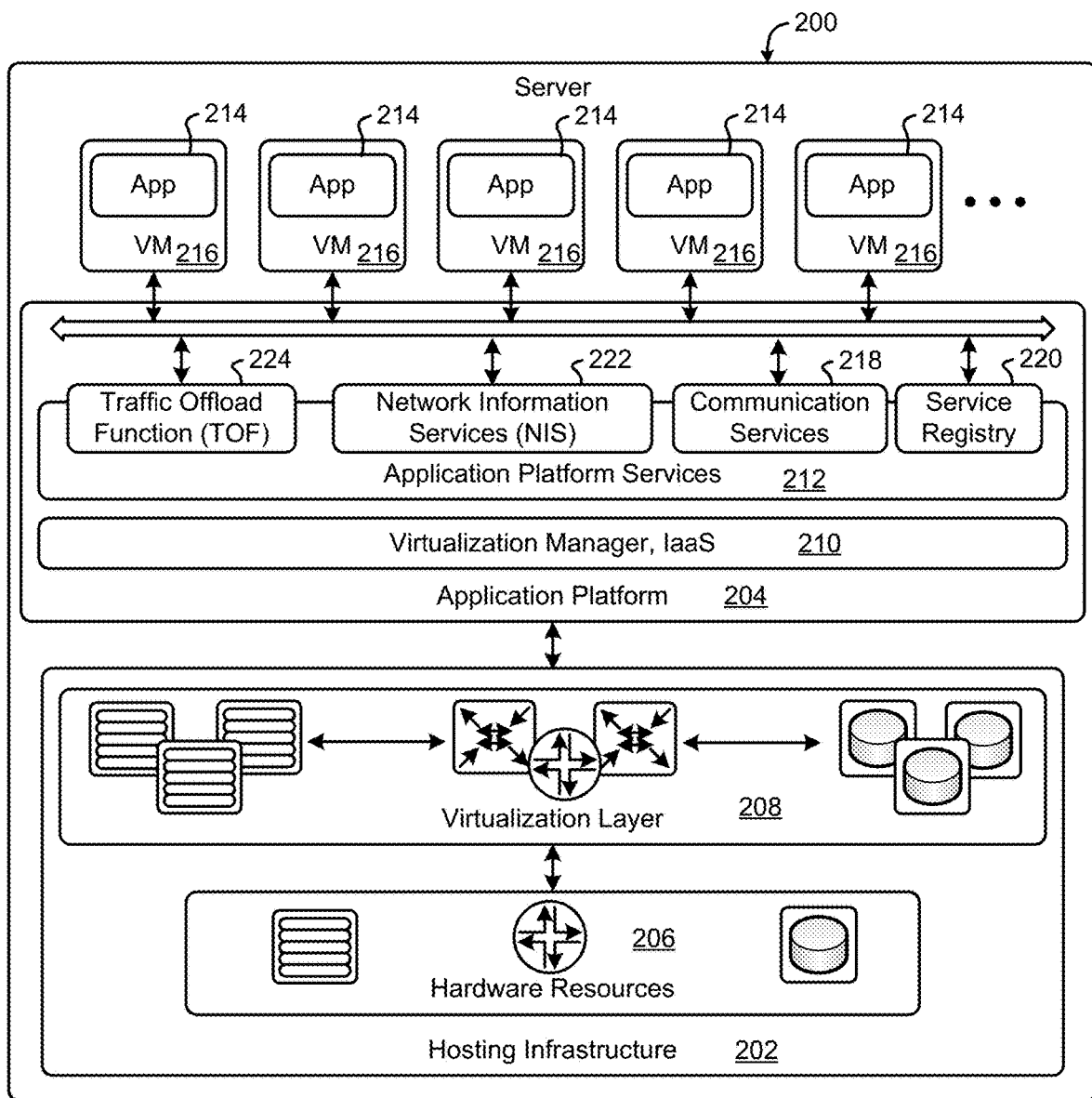
FIG. 20 is a block diagram illustrating a logical platform under which an Electronic Device can provide virtualization services.

FIG. 20 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 50 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 20 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 20, the illustrated server 200 generally comprises a hosting Instance 202 and an application platform 204. The hosting Instance 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP).

The application platform 204 provides the capabilities for hosting applications and includes a virtualization manager 210 and application platform services 212. The virtualization manager 210 supports a flexible and efficient multi-tenancy run-time and hosting environment for applications 214 by providing Instance as a Service (IaaS) facilities. In operation, the virtualization manager 210 may provide a security and resource "sandbox" for each application being hosted by the platform 204. Each "sandbox" may be implemented as a Virtual Machine (VM) image 216 that may include an appropriate operating system and controlled access to (virtualized) hardware resources 206 of the server 200. The application-platform services 212 provide a set of middleware application services and Instance services to the applications 214 hosted on the application platform 204, as will be described in greater detail below.

Applications 214 from vendors, service providers, and third-parties may be deployed and executed within a respective Virtual Machine 216. For example, MANagement and Orchestration (MANO) functions and Service Oriented Network Auto-Creation (SONAC) functions (or any of Software Defined Networking (SDN), Software Defined Topology (SDT), Software Defined Protocol (SDP) and Software Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside virtualized mobile network elements in data centers that are used for supporting the processing requirements of the C-RAN. Network Information Services (NIS) 222 may provide applications 214 with low-level network information. For example, the information provided by MS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 224 in various ways, including: A Pass-through mode where (either or both of uplink and downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

The virtualization of network functions is considered to be a foundational technology for the architecture of flexible 5G networks. Function virtualization is a technology that allows for the creation of virtual functions on a base of computing resources (which may include both compute resources and storage resources such as executable memory and general storage) and connectivity or network resources. In many cases, computing, and connectivity resources will exist within a data center. It should be understood that this discussion refers to resources instead of actual hardware because it is possible for virtualized resources to serve as the underlying resources for a next level of virtualization.

Virtualization may take the form of instantiating a virtual machine (VM) that, to another entity on a network and to software executed on the VM, is no different than a physical node in the network. A VM has its own set of compute, memory and network resources, upon which an operating system can be executed. The VM can have a virtual network interface that can be assigned a network address. Between the underlying resources and the VM, there is typically a hypervisor that manages the resource isolation and network interactions. One of the purposes of a VM is to provide isolation from other processes run on the system. When initially developed, a VM was a mechanism to allow different network processers to operate without concern that a single errant process would be able to cause a complete system crash. Instead, an errant process would be contained to its own VM. This isolation allows for each VM to have its own set of network interfaces. Typically, a single underlying resource can support a plurality of virtualized entities.

A more recent development has been the use of containers in place of VMs. Each VM typically includes its own operating system which typically increases redundant resource usage. Containers allow a single OS kernel to support a number of isolated virtual functions. In place of a hypervisor that allows each VM to run its own OS, a single OS hosts containers that are responsible for enforcing the resource isolation that would otherwise be provided by the VM. Each virtualized function within its own container can be provided a virtualized network interface so that it appears as its own network entity.

Figure 21:
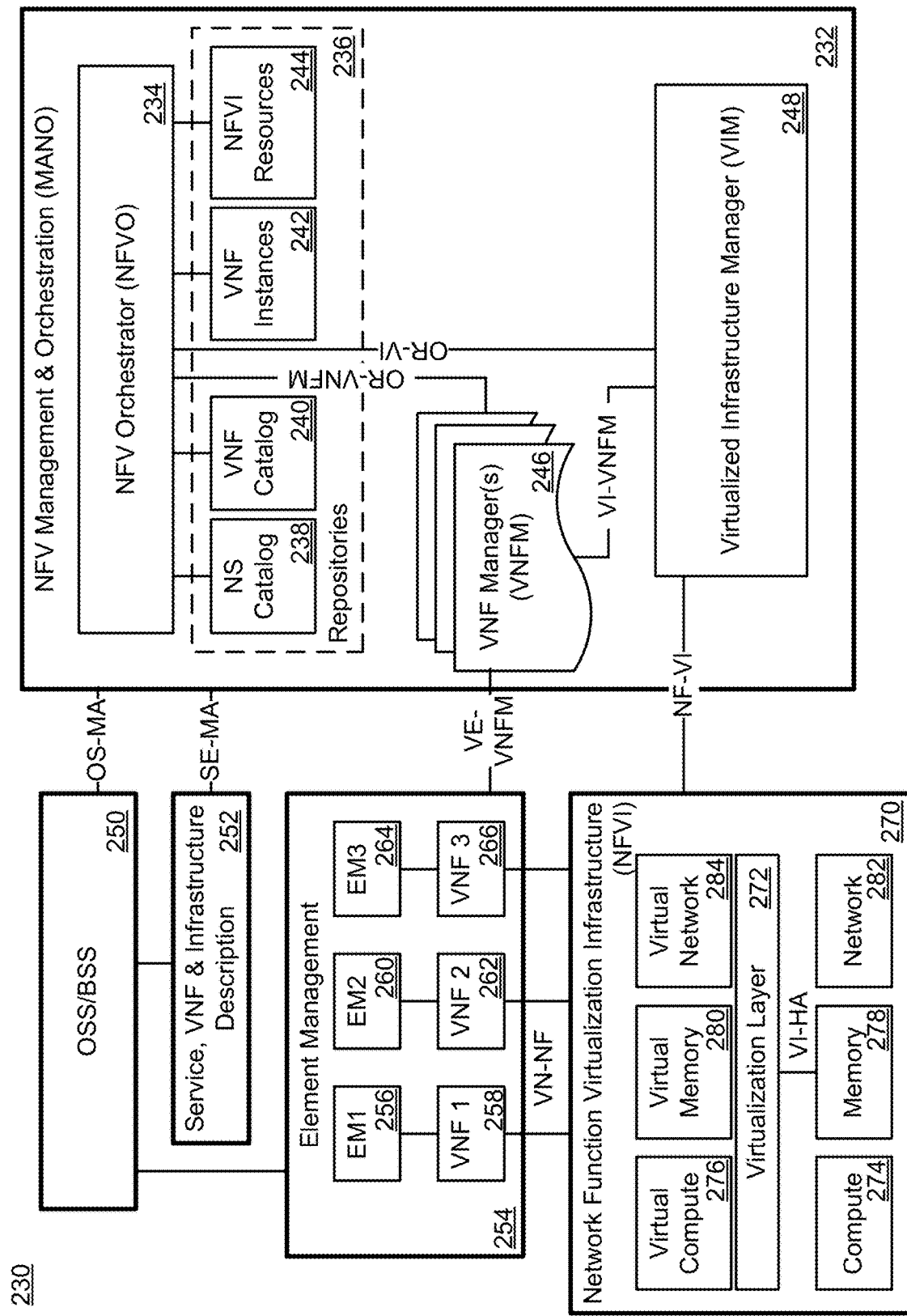
FIG. 21 is a block diagram illustrating an ETSI NFV MANO compliant management and orchestration service.

With virtualization used in a networked environment, a question arises as to how the management of the instantiation, modification, and tear-down of virtualized functions is managed or orchestrated. To address this concern, the European Telecommunications Standards Institute (ETSI) has developed a set of standards for Network Function Virtualization (NFV) MANagement and Orchestration (MANO). As illustrated in FIG. 21, the NFV-MANO system allows for the management of NFV instantiation and modification. As illustrated, there can be interfaces to existing systems such as the OSS/BSS. In network architecture 230, an NFV-MANO system 232 includes an orchestrator 234 which can access libraries 236 such as Network Service catalog 238, VNF Catalog 240, VNF Instances repository 242 and NFVI resources repository 244. The NS Catalog 238 may include templates which can be used as the basis for supporting network services. VNF catalog 240 may contain templates for the instantiation of different classes of VNFs. A particular VNF, after being instantiated, may be referred to as a VNF instance, and its attributes may be stored in VNF instances repository 242. NFVI resources 244 may be used to track the availability of resources, including both virtual resources and the physical Instance upon which they are instantiated. The NFVO 234 can be connected to a number of VNF Managers 246 through an OR-VNFM interface, and to a Virtualized Instance Manager (VIM) 248 through a OR-VI interface. The VNFM 246 and VIM 248 can be connected to each other through a VI-VNFM interface.

The NFV MANO 232 can communicate with an OSS/BSS system 250 through OS-MA interface, and to a Service, VNF & Instance description database 252 though an SE-MA interface. The Service, VNF & Instance description database 252 can contain operator information about the services, VNFs and Instance deployed in the network. Service, VNF & Instance description database 252 and OSS/BSS 250 can be connected to each other so that the OSS/BSS 250 can update and maintain the Service, VNF & Instance description database 252 as needed.

NFVI 270 interacts with the VIM 248 through the NF-VI interface. Underlying resources can often be classified as compute resources 274, memory resources 278 and network resources 282. Memory resources 278 may also be referred to as storage resources, while network resources 282 may also be referred to as connectivity resources. A virtualization layer 272 allows for the abstraction of the underlying resources which it is connected to through a VI-HA interface. It should be understood that the underlying resources may be either physical or virtual resources. The Virtualization layer 272 allows for the abstraction of the underlying resources into virtual compute resources 276, virtual memory resources 280 and virtual network resources 284. These virtualized resources can be provided to the element management system 254 through the VN-NF interface so that they can be used as the resources upon which the VNFs (shown as VNF1 258, VNF2 262 and VNF 3 266) can be instantiated. EM 254 can be connected to the VNFM 246 within NFV MANO 232 through interface VE-VNFM, and to the OSS/BSS 250 through another interface. Each VNF instantiated upon the virtual resources provided by NFVI 270 can be associated with an element manager (EM1 256, EM2 260 and EM3 264). The use of an element manager allows the OSS/BSS to have two paths through which the VNFs can be managed. A VNF can be managed through the VNFM 246, or through the element manager associated with the VNF. Each element manager can provide the same management controls that it would otherwise provide for a physical network element. Thus, the OSS/BSS 250 can treat each VNF as a conventional network function. Modification to the resource allocation associated with a VNF can be requested by an element manager through the VNFM 246, or through a request from the OSS/BSS 250 over the OS-MA interface.

The virtualization of network functions allows functions to be deployed with the resources that are required and not with an intentional over provisioning. In conjunction with the above described slicing and data center utilization, flexible networks can be deployed in a manner that allows an operator to dynamically modify the connectivity between functions (thus changing the logical topology of the network) and to dynamically modify the resources and location of the network functions (thus changing the physical topology of the underlying network). Additional resources can be allocated to existing function to allow for scaling up of an existing function, and resources can be removed from an allocation to allow for a scaling down of a function. Resources from more than one resource pool or data center can be allocated to a function so that it can be scaled out, and resources from different pools can be removed to allow a function to be scaled in. Functions can be moved by transferring their state information to another network function, and in some instances, a function can be moved through a combination of scaling out and scaling in functions.

Figure 22:
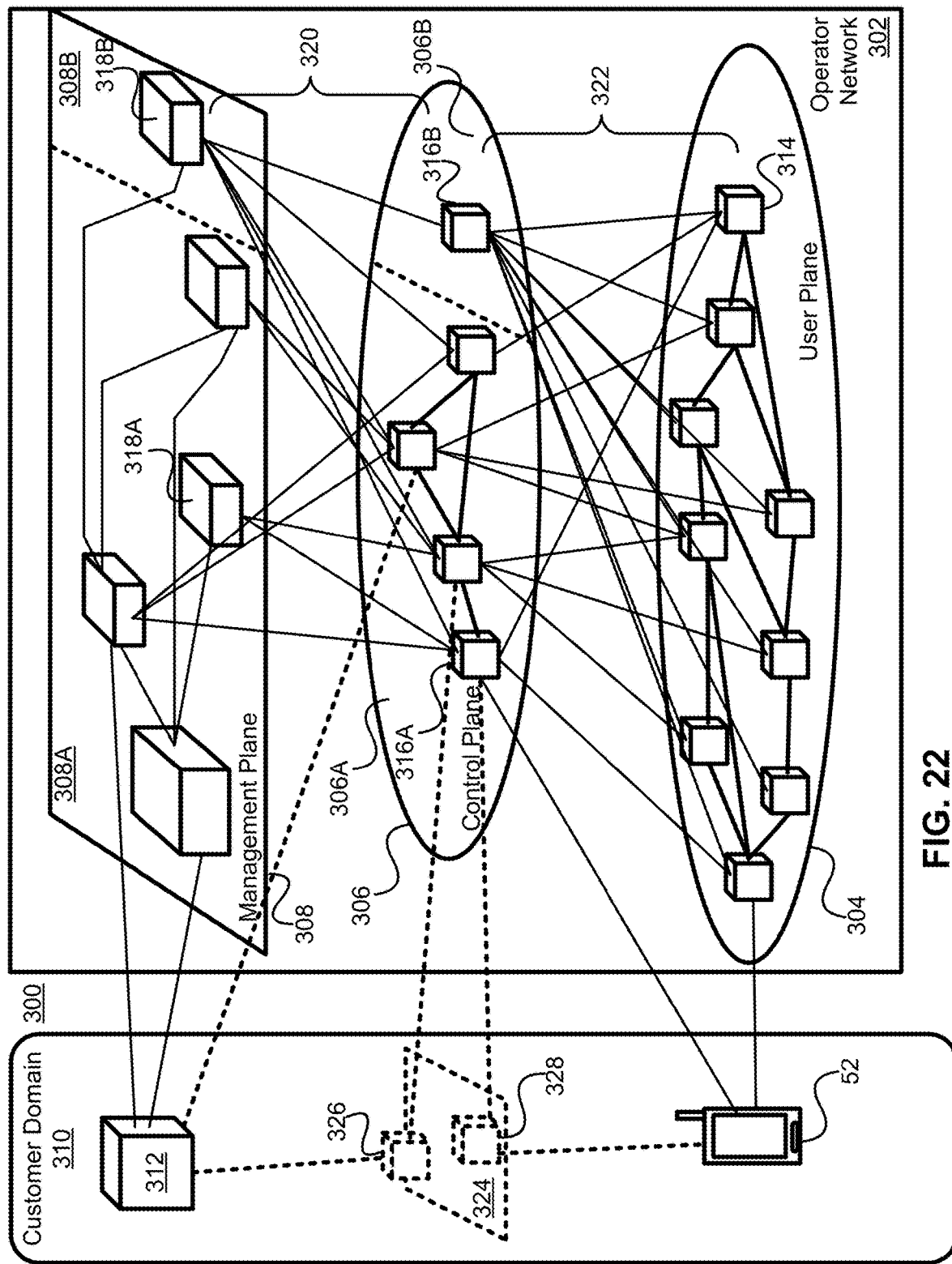
FIG. 22 is a diagram illustrating an embodiment of interactions between the Management Plane, Control Plane and User Plane of a network.

FIG. 22 illustrates a network architecture 300 in which the resources of the operator network 302 are divided into a set of logical planes, a User Plane (UP) 304, a Control Plane (CP) 306 and a Management Plane (MP) 308. The UP 304 is typically focused on packet transport, but certain functions including packet filtering and traffic shaping can be performed in the UP 304, although this is typically performed based on instructions from a network function in the CP 306. Functions in the MP 308 receive input from network functions within the customer domain 310 about the policies that should be enforced by the network control functions in the control plane 306. If Operator Network 302 supports network slicing, functions within MP 308 may be responsible for slice design and creation. It should be understood that a single MP 308 may be used to provide management functionality for a plurality of network slices that each have different control and user planes. Functions within the MP 308 can communicate with each other to ensure that the differing policies for a possible plurality of customers are fitted together in a suitable set of instructions.

UP 302 may also be referred to as a data plane. It carries the traffic between an ED 52 and either external data networks (not shown) or functions within the operator network. UP 302 is typically includes User Plane Functions (UPFs) 314. In some instances, a UPF 314 may be specific to a particular UE, it may be specific to a particular service (in some embodiments, it may be both user and service specific), and in other instances it may be a generic function serving a plurality of users and services. UPFs 314 are connected to each other to allow for data plane traffic to be transmitted.

The Control Plane 306 may include control plane functions (CPFs). In a 3GPP compliant network, some control plane functions (CPF) 316A have functions defined by standards, while other control plane functions (CPF) 316B may be outside the specification of the relevant standards. This may effectively result in the Control Plane 306 being divided into a standards compliant control plane segment 306A and a non-standards compliant control plane segment 306B. In a 3GPP compliant control plane segment 306A, network CPFs 316A such as an AMF, SMF, NEF, AUSF, etc. may be present, and in some embodiments more than one instance of any or all of the functions may be present. In a non-standards compliant control plane segment 308B, CPFs 316B such as an SDN Controller, or other such controllers including a SONAC-Ops controller, may be instantiated. CPFs, may be connected to other CPFs, as shown by CPF 316A, but this is not necessarily required as may be seen by CPF 316B. ED 52 may also communicate with CPFs.

The Management Plane 308 can be divided between a standards compliant section 308A and a non-standards compliant section 308B, much as CP 306 is divided. Within MP 308, network functions and nodes 318A and 318B can communicate with each other, and with a network function or node 312 within the customer domain 310. Management Plane entities 318A (within the standardized section 308A) and 318B (within the non-standards compliant section 308B) can be used to establish policy, and the mechanisms by which policy is to be enforced, based on the resources available and requirements received from the customer 312 (and possibly a plurality of different customers). Network Management Functions (NMF) may be responsible for accounting and billing functions, for element management, they may provide the services required for an Operation Support System (OSS) and a Business Support Subsystem (BSS). Outside the standardized functions, non-standardized network functions 318B may include an NFV-MANO system and a SONAC-Com controller.

NMFs 318A and 318B can receive external input from a customer node 312, and can communicate with each other. NMFs 318A and 318B can also communicate, over any of the MP-CP connections 320, with CPFs 316A and 316B to provide instructions about the policies to be enforced by CPFs 316A and 316B. Changes in the resources underlying the network 302 are also communicated by a NMF to CPFs. In CP 306, CPFs communicate with each other, and with ED 52. CPF 316 are also in communication with UPFs 314, and through this communication they can receive information such as traffic loads on links and processing loads at network functions. In conjunctions with policy information received from NMFs 318A and 318B, a CPF 316A and 316B can transmit instructions to the UPFs 314, over the CP-UP (also referred to as UP-CP) connections 322, to govern the behavior of the UPFs 314. A UPF 314 receives configuration information from a CPF 318A and 318B, and handles UP traffic in accordance with the received configuration information. Loading information (which may include both processing and network connection (or link) loading) may be gathered by a UPF 314 and provided to a CPF.

In some embodiments, the customer network function 312 may have a connection to a CFP. This CPF, with which customer network function 312 communicates, may be either a 3GPP compliant CPF 316A or a non-3GPP compliant CPF 316B. In alternate embodiments, the customer network function 312 may make use of a function within management plane 308 to relay messages to functions in control plane 306. Within the customer domain 310, there may be an optional control plane 324, with customer control plane functions 326 and 328. When such a customer control plane 324 is present, function 326 and 328 may have logical communications links with either or both of ED 52 and the customer network function 312. Customer control plane functions 326 and 328 may have connections to functions within control plane 306 (either 3GPP compliant functions 316A or non-3GPP compliant functions 316B).

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method of network slice management performed by a Communication Service Management Function (CSMF), the method comprising:
   receiving service requirements;
   receiving capability exposure information; and
   transmitting, to a Network Slice Management Function (NSMF), network slice requirements which satisfy the service requirements in accordance with the received capability exposure information, wherein the capability exposure information includes:
   management capability exposure information received from the NSMF; and
   resource capacity exposure information received from the NSMF.

2. The method of claim 1 wherein the management capability exposure information comprises any one of the following:
   request based information;
   network slice type information;
   network slice template (NST) information; and
   NST plus resource capacity exposure information.

3. The method of claim 2 wherein NST information comprises any combination of the following:
   network function (NF) chains;
   network sub-slice (NSS) dependency;
   location of NFs; and
   data exposure.

4. The method of claim 2 wherein the resource capacity exposure information comprises one or more of the following:
   computing resources information;
   storage resources information;
   network bandwidth information;
   radio access network (RAN) resources information;
   interface information; and
   resources bearing traffic information.

5. The method of claim 1 wherein the service requirements are received from a Communication Service Negotiation Function.

6. The method of 1 wherein the network slice requirements comprises information indicative of any one of the following:
   parameters;
   network slice type plus parameters;
   network slice template plus parameters;
   network slice template plus parameters plus capacity.

7. The method of claim 1 wherein resource capacity exposure information is received from functions managed by Third Generation Partnership Project (3GPP) functions and functions not managed by 3GPP.

8. A method of network slice management performed by a Network Slice Management Function (NSMF), the method comprising:
receiving network slice requirements;
receiving sub-slice capability exposure information, the sub-slice capability exposure information including sub-slice management capability exposure information and sub-slice resource capacity exposure information received from functions managed by Third Generation Partnership Project (3GPP) and functions not managed by 3GPP; and
transmitting network sub-slice requirements which satisfy the network slice requirements in accordance with the received sub-slice capability exposure information.

9. The method of claim 8 wherein
the sub-slice capability exposure information is received from a Network Sub-Slice Management Function (NSSMF).

10. The method of claim 8 wherein:
the sub-slice capability exposure information is received from a network element manager.

11. The method of claim 8 wherein:
the sub-slice capability exposure information is received from a plurality of network element manager.

12. The method of claim 8 wherein:
the sub-slice capability exposure information is received from a management and network orchestrator (MANO).

13. The method of claim 8 wherein the network sub-slice instance requirements are transmitted to the NSSMF.

14. The method of claim 8 wherein the sub-slice management capability exposure information comprises one of the following:
request based information;
network sub-slice type information;
network sub-slice template (NSST) information;
NSST and sub-slice resource capacity exposure information.

15. The method of claim 14 wherein NSST information comprises any combination of the following:
network function (NF) chains;
network sub-slice (NSS) dependency
location of NFs; and
data exposure.

16. The method of claim 14 wherein the sub-slice resource capacity exposure information comprises one or more the following:
computing resources information;
storage resources information;
network bandwidth information;
radio access network (RAN) resources information;
interface information; and
resources bearing traffic information.

17. The method of claim 8 wherein the network slice requirements are received from a Communication Service Management Function (CSMF).

18. The method of claim 17 further comprising transmitting aggregated slice capability exposure information to the CSMF.

19. The method of claim 18 wherein the aggregated slice capability exposure information comprises one of the following:
request based information;
network slice type information;
network slice template (NST) information; and
NST and slice resource capacity exposure information.

20. The method of claim 19 wherein NST information comprises any combination of the following:
network function (NF) chains;
network sub-slice (NSS) dependency;
location of NFs; and
data exposure.

21. The method of claim 19 wherein the slice resource capacity exposure information comprises one or more of the following:
computing resources information;
storage resources information;
network bandwidth information;
RAN resources information;
interface information; and
resources bearing traffic information.

22. A method of network slice management performed by a Network Sub-Slice Management Function (NSSMF), the method comprising:
receiving, from a Network Slice Management Function (NSMF), network sub-slice requirements;
receiving sub-slice capability exposure information, the sub-slice capability exposure information including sub-slice management capability exposure information and sub-slice resource capacity exposure information;
responsive to receiving the sub-slice capability exposure information, aggregating the sub-slice capability exposure information to form aggregated sub-slice capability exposure information;
transmitting, to the NSMF, the aggregated sub-slice capability exposure information.

23. The method of claim 22 wherein:
the sub-slice capability exposure information is received from a network element manager.

24. The method of claim 22 wherein:
the sub-slice capability exposure information is received from a plurality of network element managers.

25. The method of claim 22 wherein:
the sub-slice capability exposure information is received from a MANO.

26. The method of claim 22 wherein the aggregated sub-slice capability exposure information comprises information selected from one of the following:
request based information;
network sub-slice type information;
network sub-slice template (NSST) information;
NSST and the sub-slice resource capacity exposure information.

27. The method of claim 26 wherein NSST information comprises any combination of the following:
network function (NF) chains;
network sub-slice (NSS) dependency;
location of NFs; and
data exposure.

28. The method of claim 26 wherein the sub-slice resource capacity exposure information comprises one or more the following:
computing resources information;
storage resources information;
network bandwidth information;
radio access network (RAN) resources information;
interface information; and
resources bearing traffic.

29. The method of claim 22 wherein sub-slice resource capacity exposure information is received from functions managed by Third Generation Partnership Project (3GPP) and functions not managed by 3GPP.

* * * * *